(12) United States Patent
Karri et al.

(10) Patent No.: US 10,289,577 B2
(45) Date of Patent: May 14, 2019

(54) SYSTEM, METHOD AND COMPUTER-ACCESSIBLE MEDIUM FOR LOW-OVERHEAD SECURITY WRAPPER FOR MEMORY ACCESS CONTROL OF EMBEDDED SYSTEMS

(71) Applicant: New York University, New York, NY (US)

(72) Inventors: Ramesh Karri, New York, NY (US); Jerry Backer, Rosedale, NY (US); David Hely, Guilherand-Granges (FR)

(73) Assignee: New York University, New York, NY (US)

( * ) Notice: Subject to any disclaimer, the term of this patent is extended or adjusted under 35 U.S.C. 154(b) by 0 days.

(21) Appl. No.: 15/592,838

(22) Filed: May 11, 2017

(65) Prior Publication Data
US 2017/0329728 A1 Nov. 16, 2017

Related U.S. Application Data

(60) Provisional application No. 62/334,659, filed on May 11, 2016.

(51) Int. Cl.
*G06F 21/55* (2013.01)
*G06F 13/16* (2006.01)
(Continued)

(52) U.S. Cl.
CPC ...... *G06F 13/1668* (2013.01); *G06F 13/4282* (2013.01); *G06F 21/554* (2013.01); *G06F 21/79* (2013.01); *G06F 2221/034* (2013.01)

(58) Field of Classification Search
CPC .................................................. G06F 21/554
See application file for complete search history.

(56) References Cited

U.S. PATENT DOCUMENTS 8,732,632 B1 * 5/2014 Keller .............. G01R 31/31855
716/101
9,237,143 B1 * 1/2016 Dotan .................... H04L 63/08
(Continued)

OTHER PUBLICATIONS

ARM, "ARM Security Technology Building a Secure System using TrustZone Technology," ARM Limited, pp. 1-108, 2009.
(Continued)

*Primary Examiner* — Farley Abad
(74) *Attorney, Agent, or Firm* — Huntons Andrews Kurth LLP

(57) ABSTRACT

An exemplary system for wrapping an intellectual property core (IP) bus master(s), can include, for example, a plurality of IP cores associated with the IP core bus master(s), and a wrapper module connected to a serial input of the IP core bus master(s) and a serial output of the IP core bus master(s), where the wrapper module can be configured to capture and shift a plurality of values of a system bus for a plurality of bus transfers associated with the IP core bus master(s) and the IP cores. The wrapper module can be further configured to modify a wrapper control logic and a wrapper boundary register of the IP core bus master(s). A plurality of terminals can be included, which can be coupled to the IP core bus master(s), and a plurality of wrapper cells can be included, which can be associated with the plurality of terminals.

16 Claims, 20 Drawing Sheets

(51) Int. Cl.
G06F 13/42 (2006.01)
G06F 21/79 (2013.01)

(56) References Cited

U.S. PATENT DOCUMENTS

| | | | | |
|---|---|---|---|---|
| 2004/0064599 | A1* | 4/2004 | Jahnke | G06F 13/1684 710/14 |
| 2007/0101424 | A1* | 5/2007 | Ravi | G06F 13/4031 726/22 |
| 2013/0268710 | A1* | 10/2013 | Lowe | G06F 13/4027 710/306 |
| 2015/0276824 | A1* | 10/2015 | Narayanan | G01R 31/3004 324/750.3 |

OTHER PUBLICATIONS

Zhou, Yajin et al., "Dissecting Android Malware: Characterization and Evolution," IEEE Symposium on Security and Privacy, pp. 95-109, 2012.
Touba, Nur A. "Survey of Test Vector Compression Techniques," IEEE Design & Test of Computers, vol. 23, No. 4, pp. 294-303, Jul. 2006.
Stine, James E. et al., "FreePDK v2.0: Transitioning VLSI Education Towards . . . ," IEEE International Conference on Microelectronic Systems Education, pp. 100-103, Jul. 2009.
Simpson, Matthew et al., "Segment Protection for Embedded Systems . . . ," International Conf. on Compilers, Architectures and Synthesis for Embedded Systems, pp. 66-77, 2005.
Shkatov, Mickey et al., "UART Thou Mad? An Introduction to the UART Hardware . . . ," Black Hat USA, pp. 1-6, Jul. 2013.
Sharma, Mohandeep et al., "Wishbone Bus Architecture—A Survey and Comparison," Intnl. J. of VLSI Design & Comm. Sys., vol. 3, No. 2, pp. 107-124, Apr. 2012.
Shao, Zili et al., "Security Protection and Checking for Embedded System . . . ," IEEE Trans. on Computers, vol. 55, No. 4, pp. 443-453, Apr. 2006.
Porquet, Joel et al., "NoC-MPU: A Secure Architecture for Flexible Co-Hosting . . . ," IEEE Design, Automation Test in Europe Con. Exhibition, pp. 1-4, Mar. 2011.
Park, Chanik et al., "Compiler-Assisted Demand Paging for Embedded Systems . . . ," 4th ACM Intnl. Con. on Embedded Software, pp. 114-124, Oct. 2004.
Noorman, Job et al., "Sancus: Low-Cost Trustworthy Extensible Networked . . . ," 22nd USENIX Security Symposium, pp. 479-498, Aug. 2013.
Miller, Charlie et al., "A Survey of Remote Automotive Attack Surfaces," Black Hat USA, pp. 1-94, Aug. 2014.
Malik, Afzal et al., "A Low Power Unified Cache Architecture Providing Power . . . ," 2000 Intnl. Sym. on Low Power Electronics and Design, pp. 241-243, Jul. 2000.
Lee, Seungjin et al., "Hacking, Surveiling, and Deceiving Victims on Smart TV," Korea University, pp. 1-97, Jul. 2013.
Koscher, Karl et al., "Experimental Security Analysis of a Modern Automobile," 2010 IEEE Sym. on Security and Privacy, pp. 447-462, May 2010.
Koeberl, Patrick et al., "TrustLite: A Security Architecture for Tiny Embedded . . . ," ACM 9th European Con. on Computer Sys., pp. 1-14, Apr. 2014.
Kim, Lok-Won et al., "A System-On-Chip Bus Architecture for . . . ," IEEE Trans. on Very Large Scale Integration (VLSI) Sys., vol. 19, No. 10, pp. 1921-1926, Oct. 2011.
Jin, Yier et al., "Hardware Trojan Detection Using Path Delay Fingerprint," IEEE Intnl. Workshop on Hardware-Oriented Secuirty and Trust, pp. 51-57, Aug. 2008.
Hernandez, Grant et al., "Smart Nest Thermostat: A Smart Spy in Your Home," Black Hat USA, pp. 1-8, Aug. 2014.
Halperin, Daniel et al., "Pacemakers and Implantable Cardiac Defibrillators: Software . . . ," 2008 IEEE Sym. on Sec. and Pri., pp. 1-14, May 2008.
Guthaus, Matthew R. et al., "MiBench: A Free, Commercially Representative . . . ," 4th IEEE Intnl. Workshop on Workload Characterization, pp. 3-14, Dec. 2001.
Goodspeed, Travis et al., "Half-Blind Attacks: Mask ROM Bootloaders are Dangerous," 3rd USENIX Conf. on Offensive Technologies, pp. 1-6, 2009.
Galil, Zvi "On Improving the Worst Case Running Time of the Boyer-Moore . . . ," Communications of the ACM, vol. 22, No. 9, pp. 505-508, Sep. 1979.
Gaisler, Jiri et al., "GRLIB IP Core User's Manuel," Gaisler Research, pp. 1-708, Feb. 2009.
Gaisler, Jiri et al., "GRLIB IP Library User's Manual," Aeroflex Gaisler, pp. 1-78, 2010.
Francillon, Aurelien et al., "Code Injection Attacks on Harvard-Architecture . . . ," ACM 15th Conf. on Computer and Comm. Security, pp. 15-26, Oct. 2008.
El Defrawy, Karim et al., "SMART: Secure and Minimal Architecture for . . . ," 19th IEEE Annual Network & Distrubuted System Security Symposium, pp. 1-15, Feb. 2012.
Diguet, Jean-Philippe et al., "NOC-Centric Security of Reconfigurable SoC," 1st IEEE Intnl. Sym. on Networks-on-Chip, pp. 1-10, May 2007.
Cui, Ang et al., "When Firmware Modifications Attack: A Case Study of Embedded . . . ," 20th Annual Network & Distributed Sys. Security Sym. pp. 1-13, Feb. 2013.
Cotret, Pascal et al., "Bus-Based MPSoC Security Through Communication . . . ," 20th Ann. IEEE Intnl. Sym. on Field-Programmable Custom Comp. Machines, pp. 199-207, Apr. 2012.
IBM Microelectronics, "CoreConnect Bus Architecture," pp. 1 and 2, 1999.
Cooprider, Nathan et al., "Efficient Memory Safety for TinyOS," 5th ACM Conf. on Embedded Networked Sensor Sys., pp. 205-218, Nov. 2007.
Checkoway, Stephen et al., "Comprehensive Experimental Analysis of Automotive . . . ," 20th Usenix Conf. on Security, pp. 1-16, Aug. 2011.
Byres, Eric et al., "The Myths and Facts Behind Cyber Security Risks for Industrial . . . ," Proceedings of the VDE Kongress, vol. 116, pp. 1-6, 2004.
"Memory Protection Unity (MPU)—ARM Information Center," http://infocenter.arm.com/help/index.jsp?topic=/com.arm.doc.ddi0290g/Behjcgbj.html.
ARM, "AMBA Specification Rev 2.0," ARM Limited, pp. 1-230, 1999.
Bushnell et al., "Essentials of Electronic Testing for Digital," Memory & Mixed-Signal VLSI Circuits. Springer, pp. 1-690, Dec. 2004.
Cadence, "Encounter User Guide," pp. 1-1164, Mar. 2008.
Silva et al., "The Core Test Wrapper Handbook," Rationale and Application of IEEE Std. 1500. Springer, pp. 1-296, Sep. 2006.
Specification, Open Core Protocol and vol. I, "Release 2.0," 2003.
Sinha et al., "Correct-by-Construction Approaches for SoC Design," Springer, pp. 1-163, Sep. 2013.
Lin et al., "Essential issues in SOC design," Springer, pp. 1-405, Nov. 2006.
Silberschatz et al., "Operating system concepts," Wiley, vol. 8, pp. 1-499, Dec. 2012.

* cited by examiner

SYSTEM, METHOD AND COMPUTER-ACCESSIBLE MEDIUM FOR LOW-OVERHEAD SECURITY WRAPPER FOR MEMORY ACCESS CONTROL OF EMBEDDED SYSTEMS

CROSS-REFERENCE TO RELATED APPLICATION(S)

This application relates to and claims priority from U.S. Patent Application No. 62/334,659, filed on May 11, 2016, the entire disclosure of which is incorporated herein by reference.

FIELD OF THE DISCLOSURE

The present disclosure relates generally to memory access control of embedded systems, and more specifically, to exemplary embodiments of exemplary system, method and computer-accessible medium for a low-overhead security wrapper for memory access control of embedded systems.

BACKGROUND INFORMATION

Embedded systems can be common in consumer electronics (see, e.g., References 1-4), automotive and industrial control systems (see, e.g., References 5-7), and sensor networks. (See, e.g., Reference 8). The hardware of an embedded system can be a low-cost system-on-chip (SoC) that can use intellectual property ("IP") cores such as processors, input/output ("I/O") peripherals, memory components, and system-specific IP such as sensors (see, e.g., Reference 4), Wi-Fi (see, e.g., Reference 8), Bluetooth (see, e.g., Reference 6), etc. A system bus can integrate the IP cores for communication. However, the system bus can expose the embedded system to two classes of attacks.

Hijacking (see, e.g., Reference 9): the bus can be used to write to the restricted memory to take control of the system. Previous disclosures describe how the Universal Serial Bus ("USB") port of a learning thermostat can be used to load arbitrary code to local random access memory ("RAM") via the shared system bus. (See, e.g., Reference 1). In such example, an external device was connected to the Universal Asynchronous Receiver Transmitter ("UART") port of a mobile router. (See, e.g., Reference 3). The device automatically was granted write access to system memory over the bus. An attacker can leverage this access to control the wireless network.

Extraction (see, e.g., Reference 9): here the attacker can use the bus to read restricted memory, and leak sensitive data from the system. Malicious firmware can be embedded in systems for cars, and can use the bus leak data such as private conversations and geolocation. (See, e.g., References 6 and 10). Malicious firmware in medical devices can be used to access the bus to leak boot loader code from the read only memory ("ROM"), exposing sensitive data such as secret keys. (See, e.g., Reference 11).

One way to thwart hijacking and extraction attacks can be with a security countermeasure that can define and enforce the embedded system's memory access control policy. (See, e.g., References 10 and 11). For each IP that accesses memory (e.g., bus master), the embedded system engineer can specify its read and write access rights to each memory segment (e.g., bus slave). A software or hardware mechanism can monitor memory accesses to enforce the policy.

Countermeasures Against Hijacking and Extraction

Segmentation and paging can be commonly used to enforce memory access control policies in desktops, laptops, smartphones, and tablets. (See, e.g., Reference 12). In these approaches, Memory Management Unit ("MMU") and I/O-MMU can be used to enforce the defined policy. The MMU can incur area and power overheads that may not be acceptable in low-cost embedded systems. (See, e.g., Reference 13).

The Memory Protection Unit ("MPU") can be a light-weight MMU for advanced RISC Machine ("ARM") processors used in embedded systems. (See, e.g., Reference 14). The MPU may only detect attacks by the processor, and may not be able to monitor other bus masters that have Direct Memory Access ("DMA"). The MPU can be used to monitor all bus masters of the SoC. (See, e.g., Reference 15). This MPU design can incur about a 25% area overhead for a MicroBlaze processor (see, e.g., Reference 16), and thus cannot scale to embedded systems.

ARM TrustZone is a software-hardware architecture for memory protection in embedded systems. (See, e.g., Reference 17). To be compatible with ARM TrustZone, the IP cores should be enhanced with security features only available in ARM cores. This can limit which IP vendors the embedded system engineer can use.

The bus decoder can be augmented with registers to define restricted memory ranges. (See, e.g., References 18). When a bus master makes a memory access, the decoder can verify the address against the restricted range to detect an attack. This approach can decrease the maximum bus frequency by about 26%; a significant performance overhead compared to execution without the modified decoder.

Approaches that provide isolated software execution on embedded systems (see, e.g., References 19-21) can also enforce the memory access control policy. These mechanisms can be limited to the processor, but may not be able to detect attacks by DMA-capable bus masters. Moreover, they can make modifications to the internal logic of the processor. This needs re-validation of the modified IP cores, which the delays time-to-market of the system. Software countermeasures can add run-time checks to firmware code to monitor memory accesses. (See, e.g., References 22 and 23). Such approaches need the embedded system to host a real-time operating system ("RTOS") to process the checks against the memory access control policy.

Thus, it may be beneficial to provide exemplary system, method, and computer-accessible medium for low-overhead security wrapper for memory access control of embedded systems, which can overcome at least some of the deficiencies described herein above.

SUMMARY OF EXEMPLARY EMBODIMENTS

To that end, exemplary system, method, and computer-accessible medium can be provided for a low-overhead security wrapper for memory access control of embedded systems.

For example, an exemplary system for wrapping an intellectual property core (IP) bus master(s) can be provided which can include, for example, a plurality of IP cores associated with the IP core bus master(s), and a wrapper module connected to a serial input of the IP core bus master(s) and a serial output of the IP core bus master(s), where the wrapper module can be configured to capture and shift a plurality of values of a system bus for a plurality of bus transfers associated with the IP core bus master(s) and the IP cores. The wrapper module can be further configured to modify a wrapper control logic and a wrapper boundary register of the IP core bus master(s). A plurality of terminals can be include, which can be coupled to the IP core bus master(s), and a plurality of wrapper cells can be included, which can be associated with the plurality of terminals.

In some exemplary embodiments of the present disclosure, the plurality of terminals can include HADDR and HWRITE. The wrapper module can be configured to monitor values of HADDR and the HWRITE. A computer hardware arrangement can be provided, which can be configured to determine if an attack(s) on the system bus has occurred based on the monitored values. The wrapper module can be further configured to deny access to the system bus if the computer hardware arrangement determines that attack(s) has occurred. The wrapper module can be further configured to allow access to the system bus if (i) the computer hardware arrangement determines that attack(s) has not occurred, and (ii) the wrapper module has completed monitoring the values.

In certain exemplary embodiments of the present disclosure, the wrapper module can be further configured to independently capture and shift the values of the system bus. The IP cores can include (i) memory access controllers, (ii) processors, (iii) image processors, or (iv) input/output controllers. The wrapper module can include architecture from a previously-generated design-for-test architecture associated with the IP cores.

An exemplary system, method and computer-accessible medium for wrapping an intellectual property (IP) core bus master(s) can be provided, which can include, for example, providing a plurality of IP cores associated with the IP core bus master(s), wrapping a serial input of the IP core bus master(s) and a serial output of the IP core bus master(s) using a wrapper module, and capturing and shifting a plurality of values of a system bus for a plurality of bus transfers associated with the IP core bus master(s) and the IP cores. A wrapper control logic and a wrapper boundary register of the IP core bus master(s) can be modified. A plurality of terminals associated with the IP core bus master(s) can be monitored. The terminals can include HADDR(s) and HWRITE(s). The monitored values can be used to determine if an attack(s) on the system bus has occurred. Access to the system bus can be denied if the attack(s) has been determined to have occurred.

In some exemplary embodiments of the present disclosure, Access to the system bus can be allowed if (i) the attack(s) has been determined to not occurred, and (ii) the values are no longer being monitored. The values of the system bus can be independently captures and shifted. The IP cores can include, e.g., (i) memory access controllers, (ii) processors, (iii) image processors, or (iv) input/output controllers. The serial input and/or the serial output can be wrapped using architecture from a previously-generated design-for-test architecture associated with the IP cores.

A further exemplary system for wrapping a memory access controller (MAC), can be provided, which can include, for example, a plurality of bus masters, and a wrapper module connected to a serial input of a first master of the bus masters and a serial output of a last bus master of the bus masters, where the wrapper module can be configured to shift a plurality of values of an Advanced Microcontroller Bus Architecture (AMBA) for a plurality of bus transfers associated with the bus masters. The wrapper module can be further configured to modify a wrapper control logic and a wrapper boundary register of each of the bus masters. The system can further include a HADDR(s) and a HWRITE(s) coupled to each bus master of the bus masters, and a plurality of wrapper cells associated with the HADDR(s) and the HWRITE(s). The wrapper module can be configured to monitor values of the HADDR(es) and the HWRITE(s).

In certain exemplary embodiments of the present disclosure, a computer hardware arrangement can be included, which can be configured to determine if an attack(s) on the MAC has occurred based on the monitored values. The wrapper module can be further configured to deny access to the AMBA if the computer hardware arrangement determines that the attack(s) has occurred. The wrapper module can be further configured to allow access to the AMBA if (i) the computer hardware arrangement determines that the attack(s) has not occurred, and (ii) the wrapper module completed monitoring the values. In some exemplary embodiments of the present disclosure, the wrapper module can be further configured to independently shift the values of the AMBA for each of the bus masters.

Another exemplary embodiment of the present disclosure can include, for example, an exemplary system, method and computer-accessible medium for determining if an attack(s) on a memory access controller(s) has occurred, which can include, for example, receiving first information related to values of wrapper cells associated with an HADDR(s) and a HWRITE(s) coupled to a plurality of bus masters, and determining if the attack(s) has occurred based on the values.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
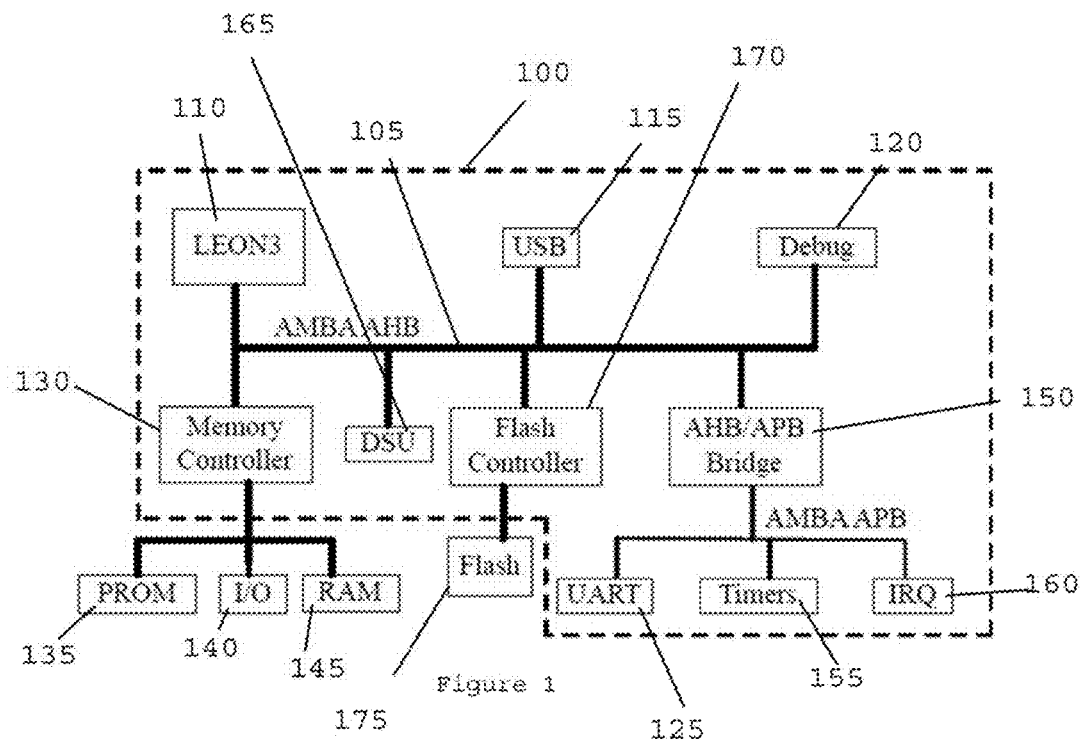
FIG. 1 is an exemplary schematic diagram of a SoC functional architecture according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and may not be limited by the particular embodiments illustrated in the figures and the appended claims.

DETAILED DESCRIPTION OF EXEMPLARY EMBODIMENTS

A wrapper for SoC memory access control ("WrapSAC") can be used for embedded systems. The exemplary WrapSAC can repurpose the IEEE 1500 Design-for-Test ("DfT") architecture (see, e.g., Reference 24) of the SoC. The benefits of reusing the DfT hardware to detect security threats in functional (e.g., normal) mode can be two-fold: i) the IEEE 1500 wrapper can provide the observability to monitor memory accesses without modifying the internal logic of 3PIP cores, and ii) once a post-silicon test can be complete, the IEEE 1500 wrappers can be unused throughout the lifetime of the system. Thus, by using the exemplary system, method, and computer-accessible medium, the following can be achieved.

1) The SoC DfT architecture can be enhanced with hardware components to monitor memory accesses in embedded systems. These modifications do not impact the internal logic of 3PIP cores, do not need additional software layers (e.g., RTOS), and incur acceptable area and power overheads (of at most about 4% on 45-nm ASIC).

2) Three exemplary versions of the exemplary WrapSAC can be designed, each with tradeoffs between security, performance overhead, area, and power costs.

3) The exemplary WrapSAC can be evaluated on a low-cost embedded system that can use an Advanced Microcontroller Bus Architecture ("AMBA")-based SoC. (See, e.g., Reference 25). AMBA can be chosen because it can be popular in SoCs used for commercial embedded systems. (See, e.g., Reference 26).

Exemplary SOC Architecture for Embedded System

FIG. 1 shows the functional architecture of an embedded system SoC 100 according to an exemplary embodiment of the present disclosure. The SoC integrator 100 can use the AMBA 105 to connect the IP cores. (See, e.g., Reference 25).

Other SoC bus architectures can include: Open Core Protocol ("OCP") (see, e.g., Reference 27), CoreConnect (see, e.g., Reference 28), and Wishbone. (See, e.g., Reference 29). The SoC can have three or more bus masters, such as, e.g.:

1) A 32-bit, in-order LEON3 processor 110 with 7 pipeline stages. The processor can run the embedded system firmware and/or a real-time operating system ("RTOS");

2) A USB controller 115 can provide a Wi-Fi card DMA to its RAM segment. The Wi-Fi card can have other memory components (e.g. ROM) not mapped to the SoC memory; and 3) A debug link 120 can provide access to UART 125 for debugging.

The SoC can have the following memory-mapped AHB slaves:

1) A memory controller 130 that can connect to: (i) a 512-MB PROM 135 for the boot loader, (ii) a 512-MB I/O block 140, and (iii) a 1-GB RAM 145 that can be equally shared by the LEON3 processor and the Wi-Fi card;

2) An AHB/APB bridge 150 can connect the bus masters to the following APB slaves: i) configuration registers for the memory controller and the serial debug, ii) UART port 125, iii) an interrupt controller ("IRQ") 155, and iv) a timer unit 160;

3) A debug support unit ("DSU") 165 can be used for instruction tracing and breakpoint insertions of the LEON3 processor 110;

4) A flash controller 170 can be included for a 512-MB flash memory 175 that can store the firmware/RTOS; and 5) A one-time-programmable ("OTP") block for SoC configuration and plug-in features. (See, e.g., Reference 30).

Table I below shows the SoC memory map, and one exemplary embodiment of its access control policy. The policy can break the memory into segments. For each memory segment-bus master pair, 2 bits can define the master's read (e.g., most significant bit) and write (e.g., least significant bit) access rights to the segment. When the bit can be 1, the bus master can be granted access.

TABLE I

SoC Memory Map and one embodiment of its access control policy. Addresses are in hexadecimal. For each memory segment, the table has a pair of bits for each bus master's read (most significant bit) and write access (least significant bit) rights to the. A 1-bit indicates the master has access to the segment.

| Memory Segment | Address Range | Bus Masters | | |
| --- | --- | --- | --- | --- |
| | | LEON3 | USB | Debug |
| PROM | 00000000-1FFFFFFF | 00 | 00 | 00 |
| I/O | 20000000-3FFFFFFF | 11 | 00 | 11 |
| LEON3 RAM | 40000000-5FFFFFFF | 11 | 00 | 00 |
| Wifi RAM | 60000000-7FFFFFFF | 00 | 11 | 00 |
| APB-Mem Ctrl | 80000000-800000FF | 10 | 10 | 10 |
| APB-UART | 80000100-800001FF | 00 | 00 | 00 |
| APB-IRQ | 80000200-800002FF | 11 | 11 | 00 |
| APB-Timer | 80000300-800003FF | 11 | 11 | 00 |
| APB-Debug Ctrl | 80000800-800008FF | 11 | 00 | 00 |
| DSU | 90000000-9FFFFFFF | 00 | 00 | 00 |
| Flash | A0000000-BFFFFFFF | 00 | 00 | 00 |
| Config | FFFFF000-FFFFFFFF | 10 | 10 | 10 |

Exemplary SoC Design-for-Test Architecture

Figure 2:
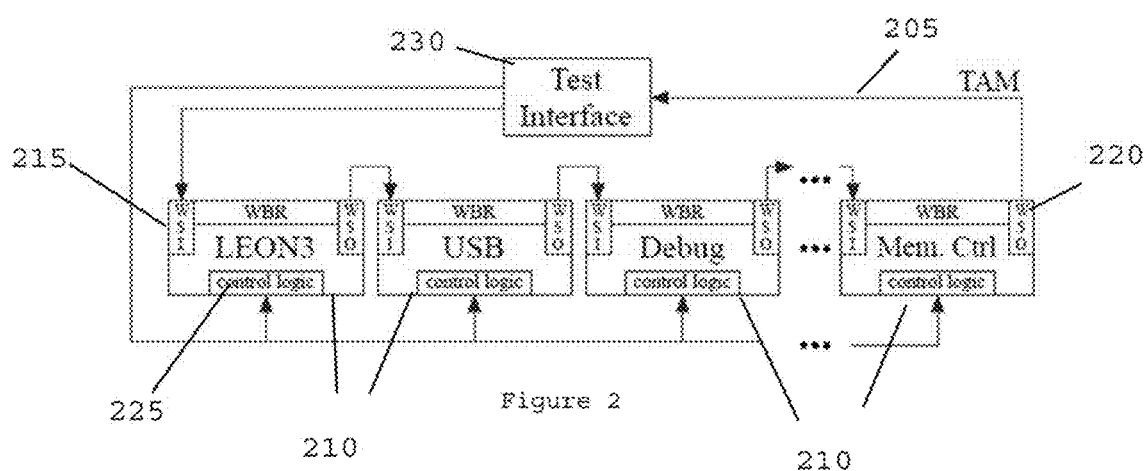
FIG. 2 is an exemplary schematic diagram of a SoC DfT architecture according to an exemplary embodiment of the present disclosure.

FIG. 2 shows the exemplary DfT architecture of the SoC for the exemplary embedded system according to an exemplary embodiment of the present disclosure. The SoC integrator can use the IEEE 1500 standard (see, e.g., Reference 24) to wrap the cores for DfT. Appendix B below illustrates the standard. A Test Access Mechanism ("TAM") bus 205 can connect the wrapped cores 210 in a daisy-chain structure through their wrapper serial input ("WSI") ports 215 and wrapper serial output ("WSO") ports 220. The TAM bus 205 can be used to shift test vectors and test responses in and out of the wrappers 210. The TAM bus 205 can also connect to the control logic 225 of the wrappers 210 to set wrapper control signals. A test interface 230 can drive wrapper control signals and test vectors via the TAM bus 205. The test interface can be an IEEE 1149.1 test access port ("TAP") controller (see, e.g., Reference 31) or a an IEEE 1500 wrapper interface port ("WIP"). (See, e.g., Reference 24).

Exemplary Threat Model And Experimental Setup
Exemplary Threat Model and Assumptions The threat model that can facilitate a malicious firmware running on a bus master can use the AMBA bus to read from restricted memory to leak data (e.g., extraction), or to write to restricted memory to modify the system (e.g., hijacking). The malicious firmware can be injected into the system (see, e.g., Reference 11), installed via firmware update (see, e.g., Reference 32), or can be obtained from a malicious third party firmware developer. (See, e.g., Reference 33). The attacker can use a combination of the following accesses to restricted memory:

1) One or more non-sequential (e.g., single-transfer) AHB requests; for example, firmware on the LEON3 processor modifies USB configuration registers mapped to the Wi-Fi RAM (see, e.g., Reference 34) to deny Wi-Fi access to its RAM;

2) One or more AHB burst requests; for example, firmware on the USB host reads the PROM to leak sensitive data such as a 128-bit encryption key or to dump the complete boot loader; and 3) One or more APB requests; for example, firmware in the LEON3 processor can enable the APB UART port reserved for debug mode to leak sensitive data.

Attacks can be assumed where an attacker can be limited to non-invasive physical access, such as connecting an external host to the embedded system peripherals (e.g., USB, debug). Bus probing and invasive physical attacks, such as fault injection and side-channel, can be out of scope. The IP cores can be assumed to be trusted, and can have no hardware Trojans. The integrator can optimize the system bus based on specifications of the embedded system. This can be a reasonable assumption because system buses for SoCs (e.g., AMBA, OCP, Wishbone, etc.) can be an open-standard. It can also be assumed that the SoC integrator can be trusted.

During an exemplary system design, the embedded system engineer can provide the functional specifications and the memory access control policy to the SoC integrator. The integrator can procure IP cores that can meet functional specifications, and that can use the IEEE 1500 standard for the DfT architecture. The integrator can design the exemplary WrapSAC according to the exemplary memory access control policy. The integrator can procure 3PIP cores unwrapped, or already wrapped, for DfT, by IP vendors. If the cores can be unwrapped, the SoC integrator can add the wrappers, and the exemplary WrapSAC components, during DfT design. If the cores are already wrapped, the SoC integrator can use an overwrapper for the exemplary WrapSAC. The overwrapper can be a lightweight IEEE 1500 wrapper enhanced with components specific to the exemplary WrapSAC.

Exemplary Experimental Setup

An exemplary prototype of the SoC using RTL of the IP cores was built. (See e.g., Reference 30). The functional and DfT architectures were implemented in accordance with FIGS. 1 and 2, respectively. For each version of the exemplary WrapSAC, the IEEE 1500 wrapper of the LEON3 processor, the test interface, and the TAM bus were enhanced. Similar wrappers were designed for other bus masters. The security effectiveness of the exemplary WrapSAC was evaluated using firmware running on the LEON3 processor. The LEON3 processor can run at 450 MHz, and can have an instruction cache, a data cache, and no MMU. Each cache can be 4-KB, 2-way set associative, and can have block sizes of 16 bytes. Benchmarks from the MiBench (see, e.g., Reference 35) and Powerstone (see, e.g., Reference 36) suites were used because they are representative of low-power applications used in embedded systems. The timing model of the exemplary prototype was used to simulate each benchmark. The benchmarks do not make APB transfers and thus were not considered in the exemplary security evaluations. For area and power evaluations, Cadence RTL Compiler (see, e.g., Reference 37) and 45-nm cell technology from the OSU FreePDK were used (see, e.g., Reference 38), as well as peak dynamic power in the exemplary evaluations.

Exemplary WRAPSAC 1.0

Figure 3:
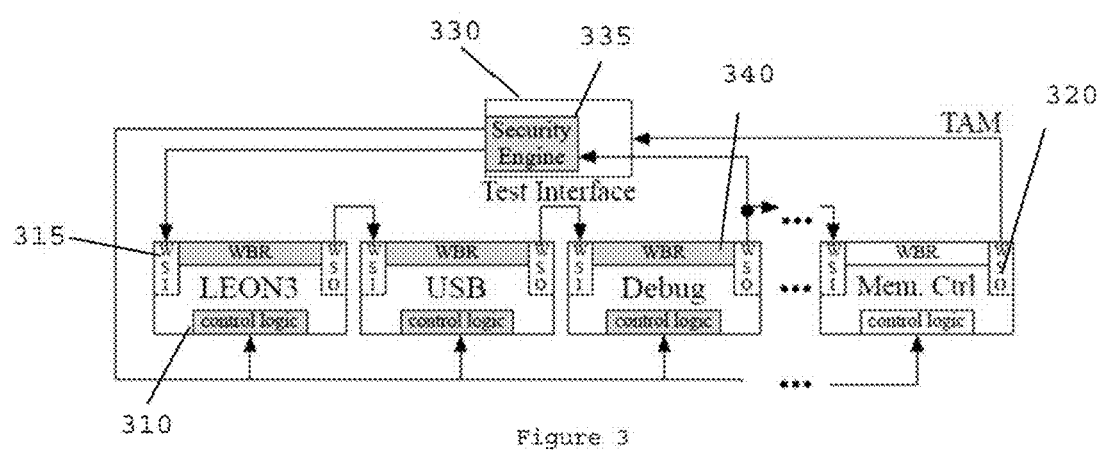
FIG. 3 is an exemplary schematic diagram of exemplary modifications to the DfT architecture using the exemplary system, method and computer-accessible medium according to an exemplary embodiment of the present disclosure.

FIG. 3 shows an exemplary schematic diagram illustrating exemplary modifications to the DfT architecture for the exemplary WrapSAC 1.0 according to an exemplary embodiment of the present disclosure. A security engine 335 can be added to the test interface 330. The exemplary security engine 305 can store the memory access control policy of the embedded system, control the wrapper 310 of each bus master when the SoC can be in functional mode, and monitor AMBA bus transfers. The exemplary security engine 335 can connect to i) the wrapper control logic signals (see Appendix B) of the bus masters to configure them for the exemplary WrapSAC operations, ii) the WSI 315 of the first bus master, and iii) the WSO 320 of the last bus master to shift values of AMBA control signals relevant to bus transfers. The exemplary WrapSAC 1.0 can modify the wrapper control logic, and the wrapper boundary register ("WBR") 340 of each bus master. Wrappers for bus slaves (e.g., Mem. Ctrl) may not be modified.

Figure 4A:
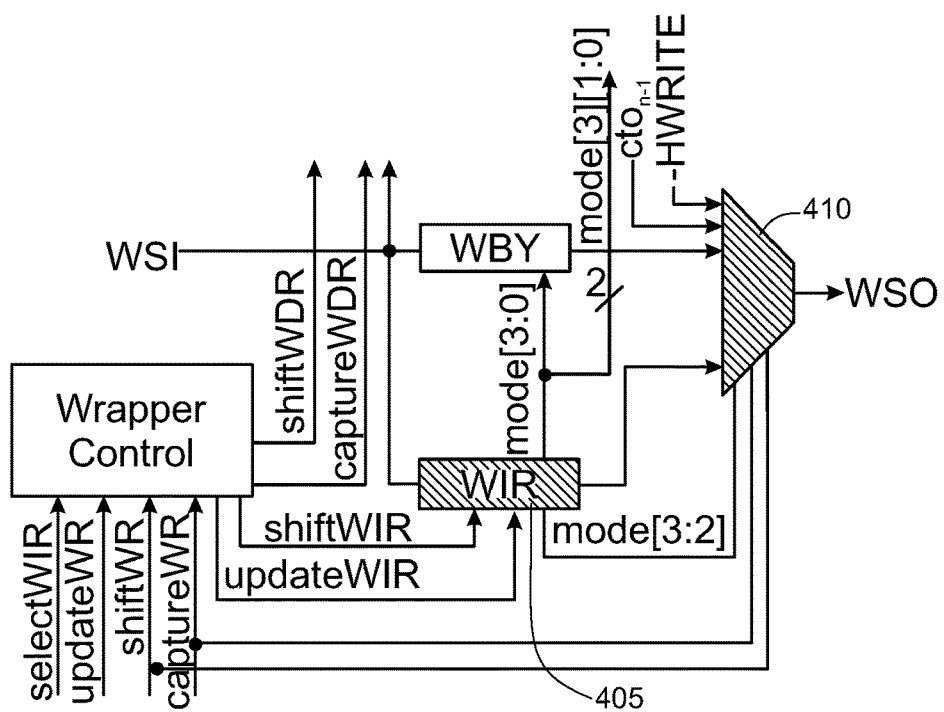
FIGS. 4A-4C are exemplary schematic diagrams illustrating modifications to the IEEE 1500 wrapper control logic according to an exemplary embodiment of the present disclosure.
Figure 4B:
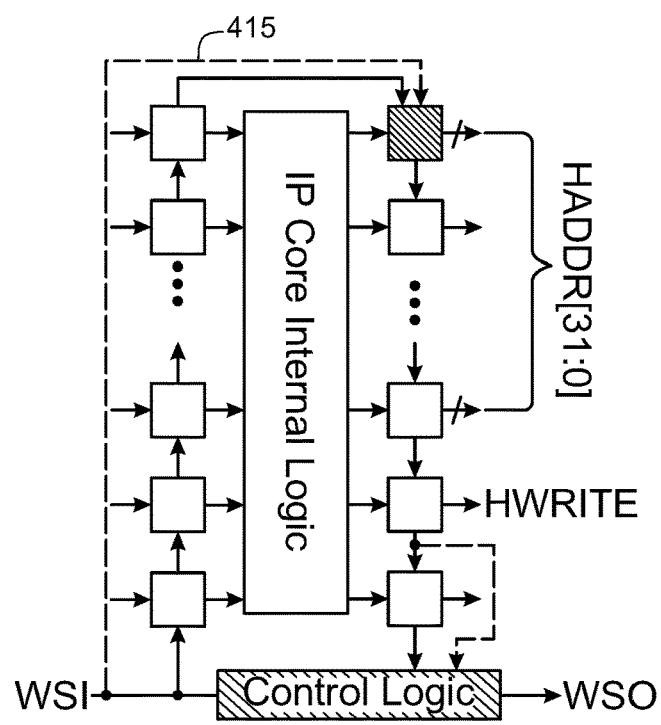

FIG. 4A shows an exemplary schematic diagram that illustrates exemplary modifications (e.g., shaded areas) to the IEEE 1500 wrapper control logic of a bus master according to an exemplary embodiment of the present disclosure. The wrapper instruction register ("WIR") decoder 405 can output a new mode signal (see, e.g., Reference 3) that can be raised when the exemplary WrapSAC 1.0 can be facilitated. The WSO multiplexer ("MUX") tree 410 can have a new input, HWRITE, which can be selected for the exemplary WrapSAC 1.0. FIG. 4B shows an exemplary schematic diagram that illustrates exemplary modifications to the WBR of a bus master (e.g., shaded areas) according to an exemplary embodiment of the present disclosure. The exemplary WrapSAC 1.0 can monitor wrapper cells of HADDR[31:0] and HWRITE terminals for AMBA bus transfers. A short path (e.g., dotted line 415) can be added to shift only values of monitored cells out of WBR for the exemplary WrapSAC. The wrapper cell for HADDR[31:0] can have a new multiplexer 420 (e.g., as shown in shaded in FIG. 4C) to form the short path from WSI to the monitored cells. The exemplary WrapSAC 1.0 can operate in two exemplary stages: i) the programming stage, where the wrappers can be configured for the exemplary WrapSAC 1.0, and ii) the capturing stage, where the security engine can take snapshots of AMBA bus transfers to detect attacks. FIG. 5 shows an exemplary state diagram for both stages (e.g., the programming stage and the capturing stage).

For example, as shown in FIG. 5, the exemplary state diagram can begin with the exemplary programming stage at state 505, where the SoC reset can equal 1, and the Count can equal zero. At state 510, if the selectWIR, the shiftWR, and the WSI can equal one. The Count can then be increased. At state 515, if the Count does not equal eight (which can be the programming instruction length), the count can be increased again if the selectWIR, the shiftWR, and the WSI can equal one. At state 515, if the Count equals eight (the programming instruction has been loaded), then at state 520, the selectWIR and the updateWR can equal one (according to the programming instruction shifted), and the shiftWR can equal zero. At the exemplary capturing stage the exemplary WrapSAC instruction has been loaded end then all values can be set to zero at state 525 (e.g., for selectWIR, shiftWR, updateWR, and SoC reset). At state 530, captureWR can equal one, and ShiftWR and Count can equal zero. If ShiftWR can equal 1, and captureWR can equal zero at state 535 (which can be the length of the snapshot to be taken by the exemplary WrapSAC), the Count can be increased. If the Count can be less then ninety-nine, then the exemplary state diagram can proceed back to state 535 to increase the Count. If the Count equals ninety-nine, the exemplary state diagram can proceed to state 530.

Exemplary WrapSAC 1.0 Programming

In an exemplary functional mode, the IEEE 1500 wrappers can be disabled with WS BYPASS. To enable the exemplary WrapSAC 1.0, a new wrapper instruction can be used, WS SEC with opcode 111. On boot, the security engine can hold the SoC reset signal and program the wrappers with WS SEC. The engine: i) can raise selectWIR and shiftWR and can set WSI of the first bus master to 1 for 9 cycles (e.g., =3 cycles per bus master×3 bus masters) to program WS SEC, and ii) can raise selectWIR and updateWR for 1 cycle to decode WS SEC. When decoding can be complete, mode[3:2] signal can be b 11. Programming can take about 10 cycles. For k bus masters, the programming stage can take about 3k+1 cycles. Once programming can be performed, the security engine can release the SoC reset signal, and the boot process can resume. In test mode, the wrapper clock can run at less than the system clock because of the power cost of the ATE. (See, e.g., Reference 39). For the exemplary WrapSAC 1.0, the security engine can control the wrappers, and can consume less power than the ATE. The wrappers can thus run at the system clock.

Exemplary WrapSAC 1.0 Capturing

To monitor bus transfers, the security engine can take snapshots of their HADDR[31:0] and HWRITE values. On a snapshot operation, the engine: i) can raise captureWR of the control logic for 1 cycle to copy the values of HADDR [31:0] and HWRITE wrapper cells to the shift path of each WBR, and ii) can raise shiftWR of the control logic for 33×3 bus masters=99 cycles to shift the values of the monitored cells out of the WBR to an internal buffer. The security engine can raise shiftWR for about 99 cycles to shift the values of HADDR[31:0] and HWRITE of each bus master. A snapshot operation can take about 100 cycles. For k bus masters and x monitored cells per bus master, a snapshot can take about (k×x)+1 cycles. After a snapshot operation can be complete, the engine can raise captureWR for a new snapshot. Snapshots do not impact the values of HADDR[31:0] and HWRITE for other IP cores because they can still be available at the functional paths of the cells.

Exemplary WrapSAC 1.0 Security Engine

The security engine of the exemplary WrapSAC 1.0 can have 2 components: i) a finite state machine ("FSM") to program the wrappers with WS_SEC and to take snapshots as discussed above, and ii) a lookup table ("LUT") with associated logic to store the memory access control policy and detect unauthorized bus transfers to restricted memory.

Figure 6:
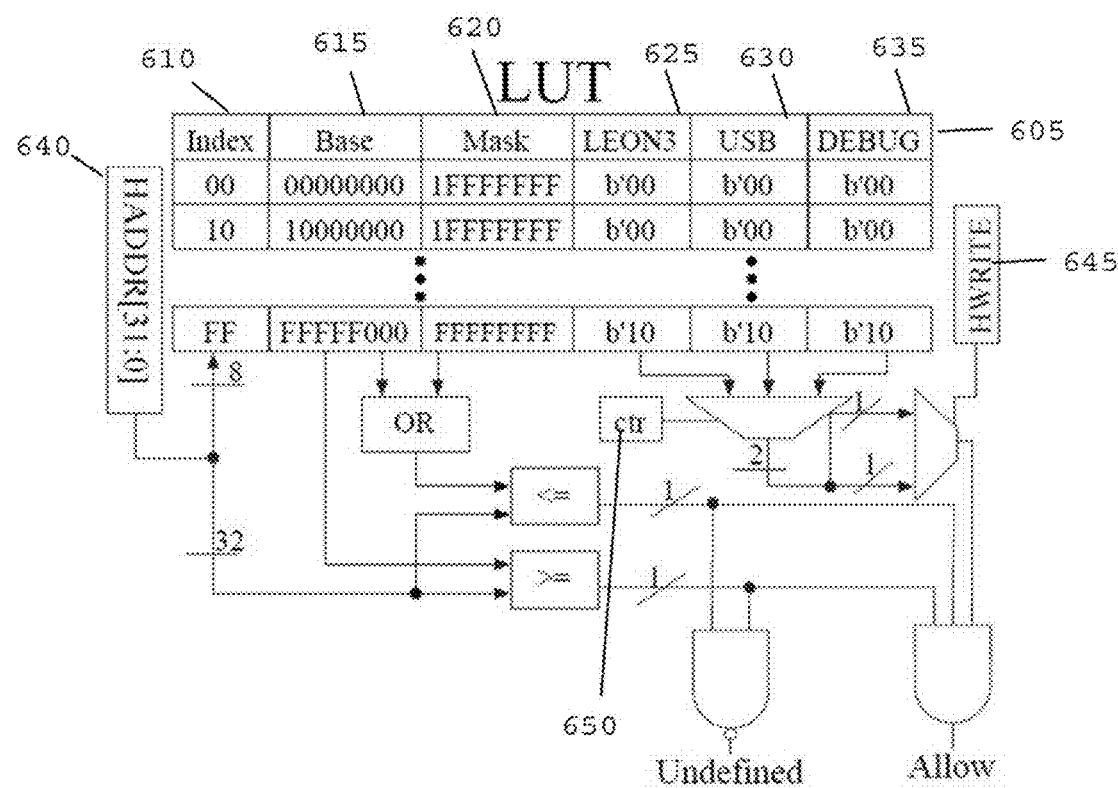
FIG. 6 is an exemplary diagram illustrating a security engine of the exemplary system, method, and computer-accessible medium according to an exemplary embodiment of the present disclosure.

FIG. 6 shows an exemplary LUT and its associated logic, according to an exemplary embodiment of the present disclosure. Each row 605 in the LUT can map to a memory segment defined in Table II below. The LUT can be indexed 610 with HADDR[31:28][11:8] 640 to consider both AHB and APB memory segments. A row 605 can have a 32-bit Base field 615 for the segment's base address, a 32-bit mask field 620 to calculate the maximum address, and a 6-bit field for the read and write access control policy of the bus masters. A 99-bit buffer can receive the values HADDR[31:0] 640 and HWRITE 645 of all bus masters on a snapshot operation. For a snapshot, the engine can process the values in the buffer one bus master at a time (e.g., 33 bits). Since the about 99 bits can be shifted in the order of the bus masters on the TAM bus, the position of HADDR[31:0] and HWRITE for each bus master can be pre-determined. For example, the least significant 33 bits can be for the last bus master on the TAM bus (e.g., Debug IP 635) and the most significant 33 bits can be for the first bus master on the TAM bus (e.g., LEON3 IP 625), with the remaining 33 bits being used for the middle bus master on the TAM bus (e.g., USB 630). The engine can use a 2-bit counter (e.g., ctr 650) to track which bus master the 33 bits belong to.

TABLE II

Power and Area Costs of WrapSAC 2.0 Components

| Component | Area (µm²) | Power (µW) |
| --- | --- | --- |
| LEON3 Wrapped | 348,315.7 | 307,122.7 |
| FSM | 829.3 | 752.5 |
| Compactor | 100.4 | 58.3 |
| Security Engine | 9,991.2 | 10,469.8 |
| Overwrapper | 2,945 | 2,515.4 |

For each bus master transfer, the engine can find the memory segment of HADDR[31:0]. If no segment can be found, an undefined signal can be raised, and the transfer can be considered restricted. Otherwise, the engine can use HWRITE to get the transfer type (e.g., read/write) and can raise an allow signal if the policy can facilitate the bus master to make this transfer. If not, allow can be set to 0, and the transfer can be to a restricted memory segment. When a transfer to restricted memory can be detected, the exemplary WrapSAC 1.0 can use one of the two exemplary recovery mechanisms. If the embedded system can run a trusted RTOS thread, the security engine can send a non-maskable interrupt to the thread to handle the attack (e.g., by disabling the driver of the malicious bus master or rebooting the LEON3 processor). If no RTOS can be present, the security engine can leverage its connection to the SoC reset signal to disable the malicious IP. This can be performed by having the engine tap to each IP's reset signal independently.

Exemplary WrapSAC 1.0 Performance, Power, and Area Overheads

Figure 4C:
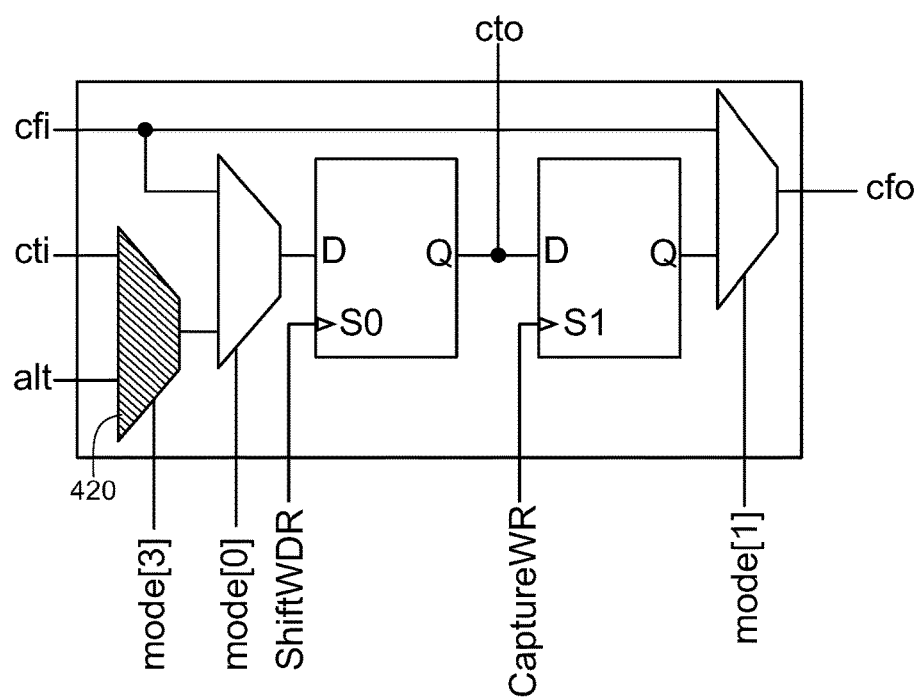
Figure 5:
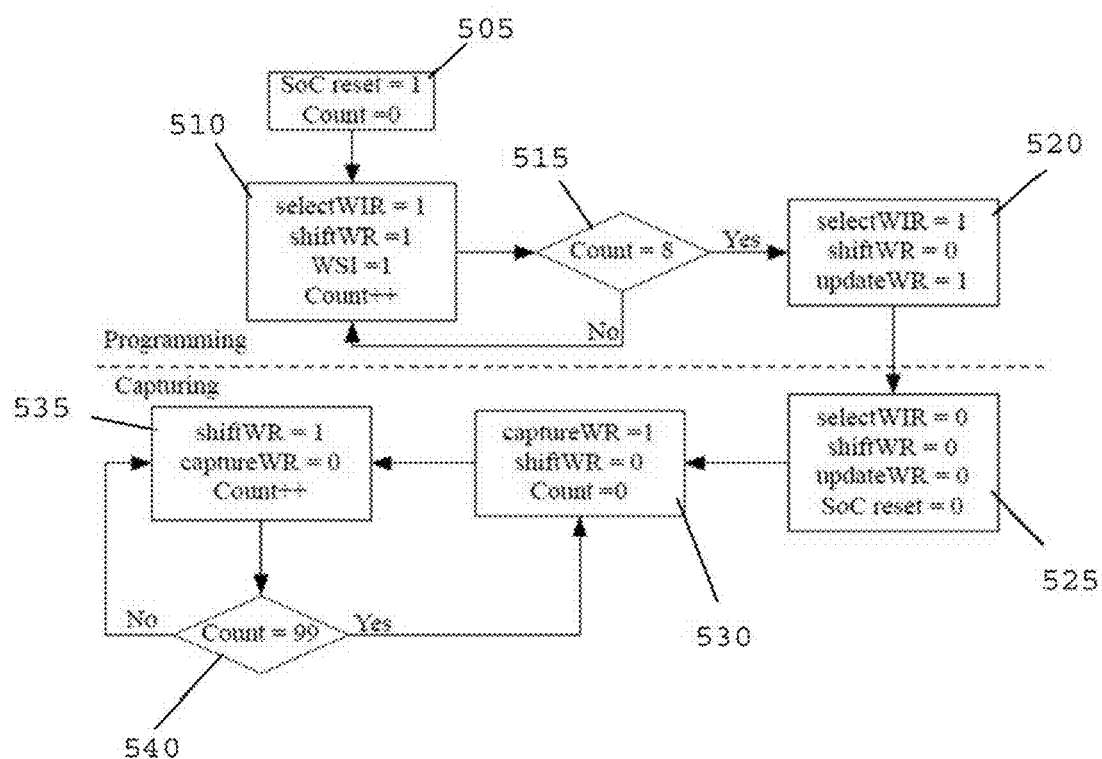
FIG. 5 is an exemplary flow functional diagram of a FSM security engine for the exemplary system, method, and computer-accessible medium according to an exemplary embodiment of the present disclosure.

The exemplary WrapSAC 1.0 can be configured as shown in FIG. 3 and the wrapper for the LEON3 processor can be modified according to FIG. 4A-4C. The security engine can be designed as described in below.

Exemplary Performance Overhead: During programming, the exemplary WrapSAC 1.0 can take about 10 cycles to program the wrappers with WS SEC. This overhead does not impact the performance of the embedded system firmware because the exemplary WrapSAC 1.0 programming can occur during boot. During firmware/RTOS execution, WrapSAC 1.0 can incur no performance overhead because snapshots can be taken concurrently with firmware execution, and transfers may not be buffered.

Exemplary Power and Area Overheads: The enhancements to the wrapper control logic and WBR can be negligible; a few multiplexers can be added to the WIR to decode WS SEC and to raise mode. (See, e.g., Reference 3). A new multiplexer can be added to the WSO MUX tree to select the HWRITE signal when mode (see, e.g., Reference 3) can be raised. For the WBR, the wiring of the short path can be minimal, and only one of the wrapper cells can be enhanced with a multiplexer. The main overhead can come from the security engine; on 45-nm technology, the engine can have area and power costs of about 1,640.2 µm and about 0.4 mW respectively. The overhead of the engine can be evaluated with respect to the LEON3 processor. The overhead of the engine can be considered if the IP cores can be procured unwrapped. The SoC integrator can wrap the cores for DfT, and can enhance the wrappers of the bus masters for the exemplary WrapSAC 1.0. When wrapped, the LEON3 processor can have area and power costs of about 348,315.7 µm2 and about 307.1 mW respectively. The engine thus can incur about 0.4% arc and about 0.13% power overheads on the LEON3 processor. When compared to the complete SoC, this overhead can be negligible. If the IP cores can already be wrapped by IP vendors, the overwrapper can be used to configure the exemplary WrapSAC 1.0. The overwrapper can have a WBR for the cells for HADDR[31:0] and HWRITE and the modified control logic shown in FIG. 4A. The overwrapper can have an area and a power costs of 2,015.2 µm2 and 1.7 mW, respectively. With the overwrapper and the security engine, the exemplary WrapSAC 1.0 can incur area and power overheads of about 1.04% and about 0.68%, respectively on the LEON3 processor.

Exemplary WrapSAC 1.0 Security Analysis

Figure 7:
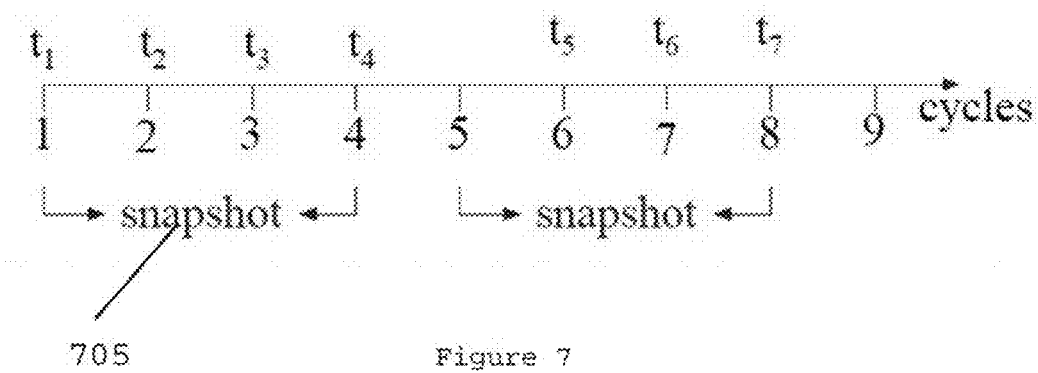
FIG. 7 is an exemplary diagram illustrating a security analysis for the exemplary system, method, and computer-accessible medium according to an exemplary embodiment of the present disclosure.
Figure 8:
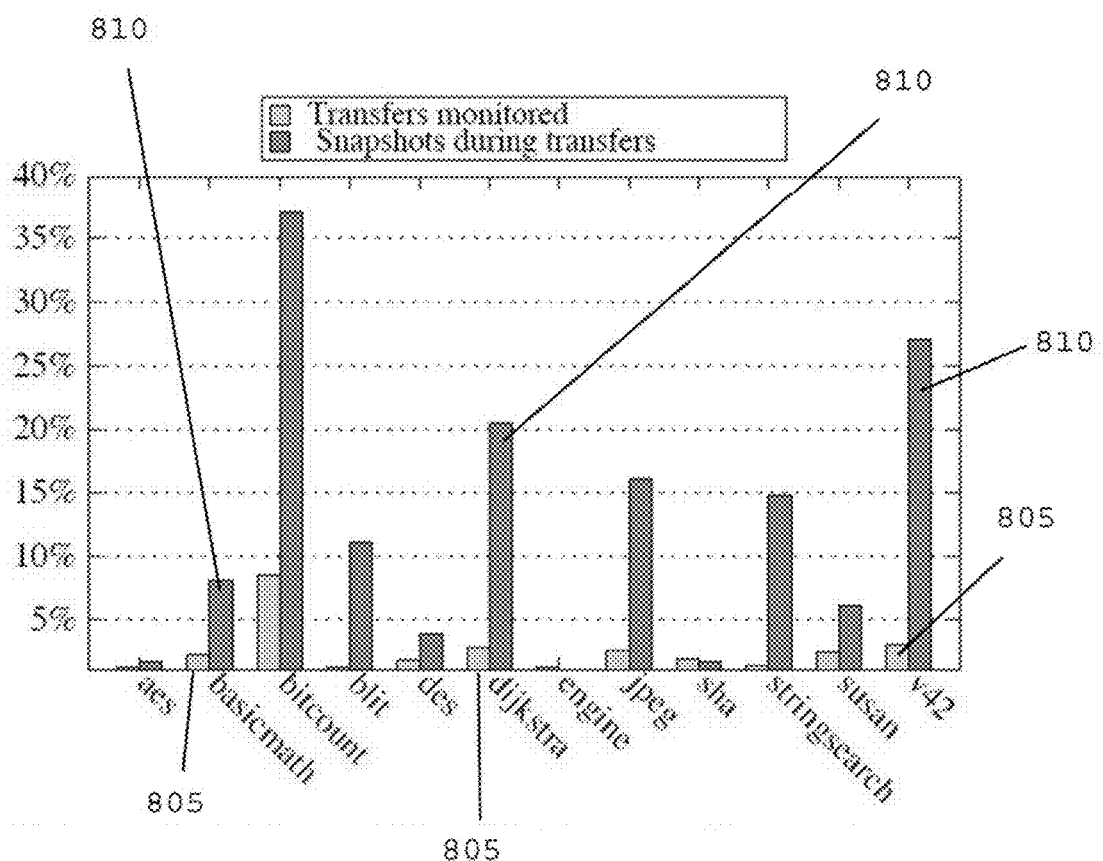
FIG. 8 is an exemplary chart illustrating the security effectiveness of the exemplary system, method, and computer-accessible medium according to an exemplary embodiment of the present disclosure.

The security effectiveness of the exemplary WrapSAC 1.0 can be based on the number of transfers it can monitor. If the security engine takes a snapshot of each transfer, then it can verify each transfer against the memory access control policy, and can detect all hijacking and extraction attacks. The security effectiveness of the exemplary WrapSAC 1.0 can be evaluated using the example shown in diagram shown in FIG. 7. For simplicity of the example, a snapshot operation 705 can be assumed to take about 4 cycles, and there may only be one bus master. FIG. 7 also shows two exemplary snapshot operations, the first from cycles 1 to 4, and the second from cycles 5 to 8. Throughout the 8 cycles, the bus master can issue 7 transfers (e.g., t1-t7). Transfer t1 can start at cycle 1 and the exemplary WrapSAC 1.0 can take a snapshot of it. Transfers t2 through t4 can be unmonitored because they can occur during the snapshot of t1. At cycle 5, the security engine can start a new snapshot. However, the bus master can make no transfers during that cycle (e.g., idle bus cycle) and the values of HADDR[31:0] and HWRITE, can all be zeros. The security engine can shift all zeros, and can compare them to the access control policy. This can lead to a false positive because the security engine can interpret the values as a read transfer to the ROM segment. In addition, transfers t5 through t7 can be unmonitored. Out of the two snapshot operations, only one may monitor a transfer and 6 of the 7 transfers can be unmonitored. The security effectiveness of the exemplary WrapSAC 1.0 is shown below. Exemplary benchmarks can be used for at about 500 million instructions on the LEON3 processor, and record the number of transfers monitored and the number of snapshots taken. FIG. 8 shows an exemplary chart illustrating the percentage of transfers monitored 805. The exemplary WrapSAC 1.0 can monitor about 8.4% of transfers (e.g., bitcount benchmark) and 2.5% of transfers on average. FIG. 8 also shows the percentage of snapshots 810 taken during active bus cycles (e.g., during transfers, when the bus master makes a transfer). On average, about 9.3% of snapshots can be taken during active bus cycles. Thus, about 90.7% of snapshots can occur during idle bus cycles, which can lead to false positives.

Exemplary WRAPSAC 2.0

Figure 9:
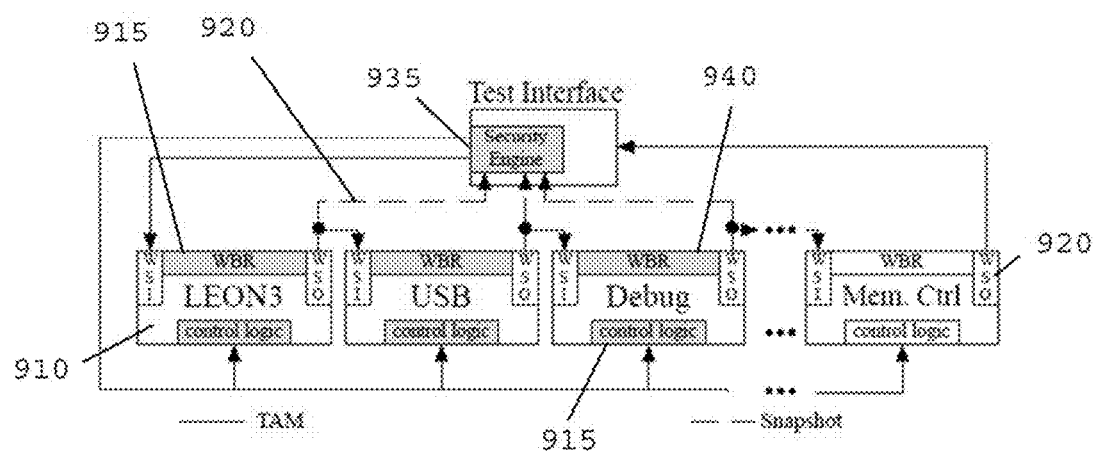
FIG. 9 is an exemplary schematic diagram illustrating exemplary modifications to the DfT architecture for the exemplary system, method, and computer-accessible medium according to an exemplary embodiment of the present disclosure.

For long snap-shot operations, there can be three complementary mechanisms: i) the 1-KB boundary requirement of the AMBA protocol can be utilized to reduce the number of snapshots needed to monitor AHB burst requests, ii) a snapshot bus can be added to shift values of monitored wrapper cells of each bus master independently, and iii) a low-overhead compactor can be used to reduce the number of wrapper cells of HADDR[31:0] to monitor. For false positives, due to snapshots taken during idle bus cycles, a trigger FSM can be added to each wrapper control logic of a bus master. The trigger FSM can initiate snapshot operations only when an AMBA bus transfer occurs. The exemplary WrapSAC 2.0 does not modify the programming stage of the exemplary WrapSAC 1.0. FIG. 9 shows an exemplary diagram that illustrates the modifications to the DfT for the exemplary WrapSAC 2.0 (e.g., shaded area). The security engine 935, WBR 940, and control logic 915 modifications can be modified from the design of the exemplary WrapSAC 1.0. A 1-bit wide snapshot bus 920 can be added to the WSO 920 of each bus master and can connect to the security engine.

Exemplary WrapSAC 2.0 Monitoring of AHB Burst Requests

To monitor an AHB burst request, the security engine of the exemplary WrapSAC 1.0 can take a snapshot of each transfer. It can be observed that the snapshot of only one of the transfers can be sufficient to monitor the request, as long as the AHB memory segment can be ≥1-KB. This can be because the AMBA protocol may not facilitate transfers within a burst request to cross the 1-KB boundary. (See, e.g., Reference 25). Therefore, an attacker cannot use a burst request to make transfers to multiple AHB segments with different access control policies. As long as the security engine knows one transfer within a burst request can be facilitated, it can safely assume that the other transfers in the request can be facilitated. This can reduce the number of snapshots needed, and can free up the engine for other transfers.

Exemplary WrapSAC 2.0 Snapshot Bus

The snapshot bus (e.g., lines 920 in FIG. 9) can be a serial bus that can connect the wrapper WSO 920 of each bus master to the security engine 935. The values of the monitored cells can be shifted out of the WSO 920 of each bus master (e.g., instead of WSO of last bus master) to the engine using the snapshot bus. This can reduce a snapshot operation to about 34 cycles, 1 cycle for captureWR+33 cycles to shift HADDR[31:0] and HWRITE. With the snapshot bus, a snapshot operation can take about x+1 cycles, where x can be the number of cells monitored.

Exemplary WrapSAC 2.0 Compactor for HADDR[31:0]

Several compactor mechanisms for internal scan chains can be used to speed up post-silicon testing. (See, e.g., Reference 40). The compactor for the exemplary WrapSAC 2.0: i) can be specific to the SoC memory map, ii) may not impact the wrapper for post-silicon testing or the functional output of HADDR[31:0] iii) can have low delay and area overheads, and iv) can have zero aliasing to avoid false positives. For any address haddr that belongs to a memory segment, the compactor can perform Compact(haddr), such that Compact(haddr) still can indicate the segment of haddr.

To design the compactor, don't care bits in AHB and APB segments of the memory map are observed in Table I. For any address of a memory segment, one can flip it's don't care bits, and the new address can still point to the same segment. Don't care bits can thus be ignored for snapshot operations. For AHB segments of PROM, I/O, LEON3 RAM, Wi-Fi RAM, DSU, and Flash, HADDR[27:0] can be don't care bits. This can be because bits of HADDR[31:28] can be sufficient to indicate which of these AHB segments an address can belong to. However, for the AHB Config. segment, only bits of HADDR[11:0] may be don't cares. This can be because bits HADDR[31:12] can be fixed at 0xFFFFF. When intersecting all AHB segments, bits of HADDR[11:0] can be don't cares. For APB segments, bits of HADDR[7:0] can be don't cares. This can be because bits of HADDR[31:28] and HADDR[27:12] can be fixed at 0x8 and 0x0000 respectively, and bits of HADDR[11:8] can be needed to indicate which APB segment an address belong to. When intersecting don't care bits for AHB and APB segments, the don't care bits of the memory map can be bits of HADDR[7:0]. Wrapper cells for HADDR[7:0] can thus be ignored on snapshots operations.

Bits of HADDR[27:12] for the memory map can be observed. As discussed above, they can be don't cares for all AHB segments, except for Config., where they can be fixed at 0xFFFFF. For APB segments, they can be fixed at 0x0000. The exemplary compactor can use this uniformity of ones and zeros to reduce the number of bits to represent HADDR [27:12]. For example, using a 16-input AND gate, the exemplary compactor can reduce 0xFFFFF to one bit. If the output of the AND gate can be 1, then HADDR[27:12]= 0xFFFFF. The exemplary compactor can also use a 16-input OR gate to reduce 0x0000 to one bit. If the output of the OR gate can be 0, then HADDR[27:12] can be 0x0000.

Figure 10:
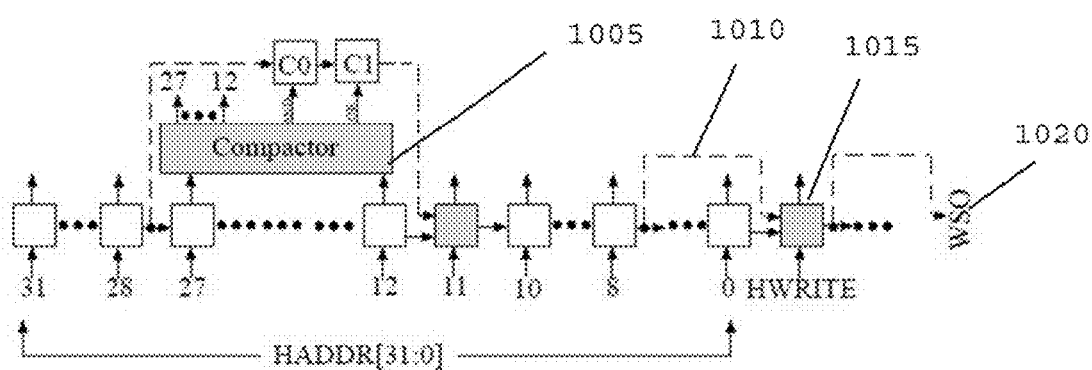
FIG. 10 is an exemplary diagram illustrating exemplary modifications to the WBR for the exemplary system, method, and computer-accessible medium according to an exemplary embodiment of the present disclosure.

With the exemplary compactor, values of HADDR[31:28] can be shifted on a snapshot because they can define all AHB segments except Config. Values of HADDR[27:12] can be reduced to 2 bits, values of HADDR[11:8] can be shifted because they can define all APB segments, and values of HADDR[7:0] can be ignored. FIG. 10 shows an exemplary diagram illustrating the modifications to the exemplary WBR for the exemplary compactor (e.g., shaded areas). The exemplary compactor 1005 can take as input the values of HADDR[27:12] and outputs HADDR[27:12] for functional use by the rest of the SoC, the output of the 16-input AND gate, and the output of the 16-input OR gate. 2 wrapper cells (e.g., C0, C1) can be added to the WBR to connect the AND and OR outputs of the compactor to the rest of the WBR. A short path (e.g., dotted line 1010) can be added to the WBR to shift only monitored cells for a snapshot. The short path 1010 can start from wrapper cells of HADDR[31:28], go through the cells C0 and C1 of the exemplary compactor, HADDR[11:8], HWRITE, and end at WSO 1020. Wrapper cells of HADDR[11] and HWRITE 1015 can be modified as shown in FIG. 4C to form the short path 1010. With the exemplary compactor 1005, the exemplary WrapSAC 2.0 can monitor about 11 wrapper cells and a snapshot can take about 12 cycles, 100/12, approximately 8 times less than that of the exemplary WrapSAC 1.0. Though this can facilitate more snapshots, it can lead to multiple snapshots for a transfer.

Exemplary WrapSAC 2.0 Trigger FSM

Figure 11:
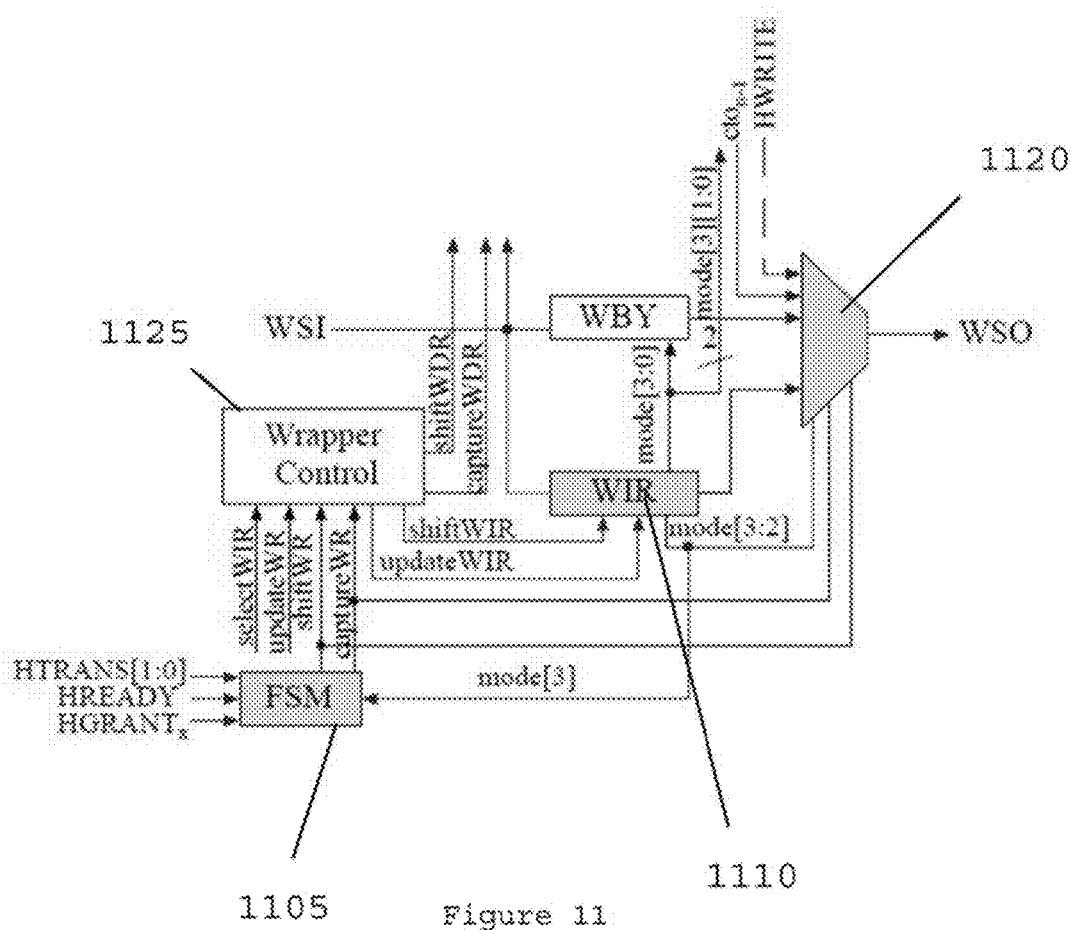
FIG. 11 is an exemplary diagram illustrating exemplary modifications to the wrapper control logic for the exemplary system, method, and computer-accessible medium according to an exemplary embodiment of the present disclosure.

FIG. 11 shows an exemplary diagram of the exemplary modifications to the wrapper control logic of a bus master for the trigger FSM 1105 according to an exemplary embodiment of the present disclosure (e.g., shaded areas). The FSM 1105 can connect to captureWR and shiftWR of the control logic (e.g., wrapper control 1125) to initiate snapshot operations. The FSM 1105 can also receive AMBA HGRANTx and HTRANS[1:0] control signals from the bus master to determine when to take a snapshot, and HREADY signal to determine when the transfer can be complete. The AMBA control signals can be tapped from the cfo of their wrapper cells. The shiftWIR and updateWIR can connect from the wrapper control 1125 to the WIR 1110, which can connect to the WSO 1120.

Figure 12:
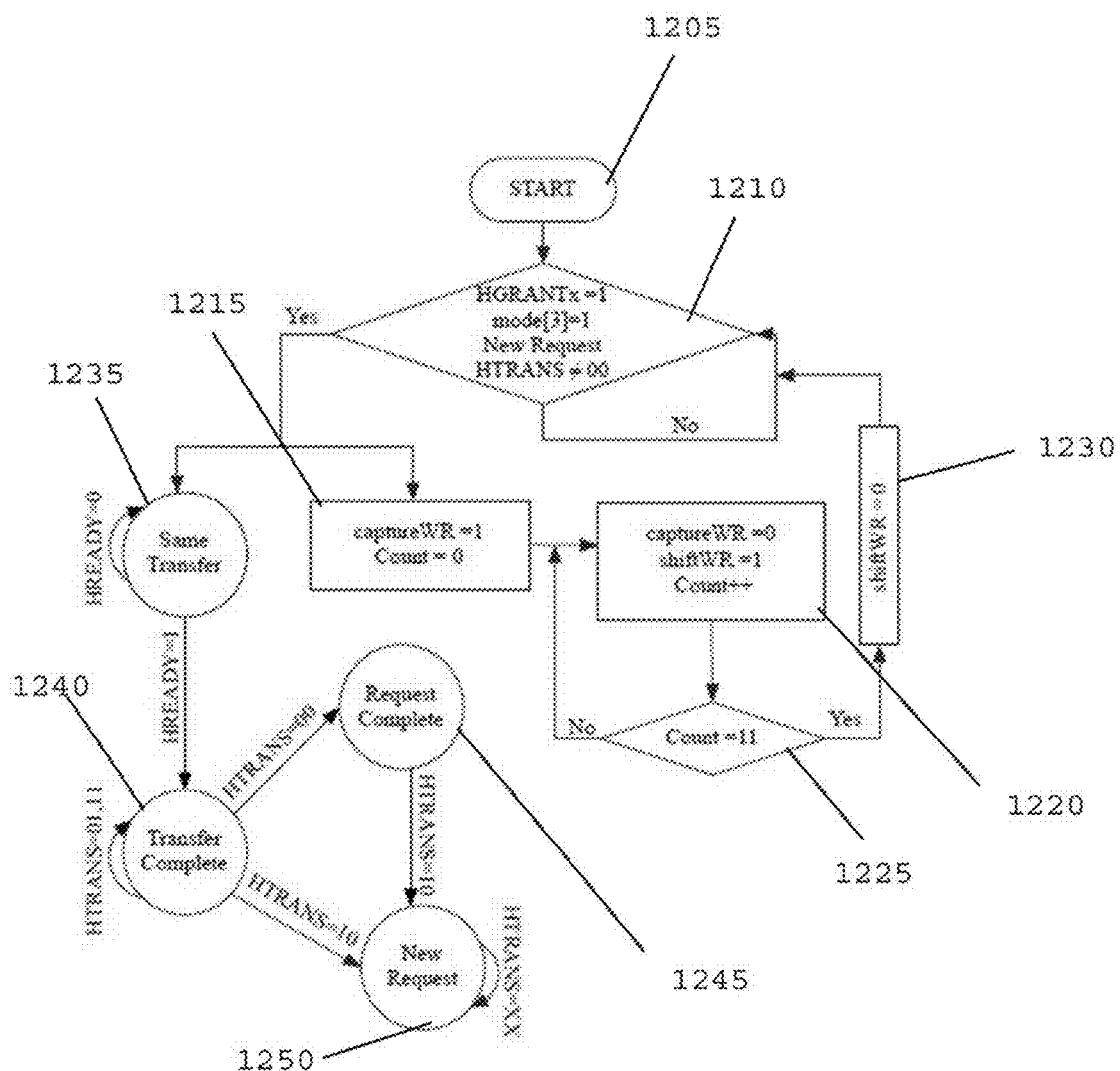
FIG. 12 is an exemplary state diagram for a trigger FSM of the exemplary system, method, and computer-accessible medium according to an exemplary embodiment of the present disclosure.

FIG. 12 shows an exemplary state diagram illustrating the state of the trigger FSM according to an exemplary embodiment of the present disclosure, which can begin at state 1205. When the bus master can be granted the bus (e.g., HGRANTx=1 state 1210), the FSM can verify i) that the exemplary WrapSAC 2.0 can be enabled (e.g., mode[3]=1), ii) that it can be in the New Request state 1250 (e.g., discussed below), and iii) that the master may not be in an idle bus cycle (HTRANS/=00). The FSM can then take a snapshot of the transfer by raising captureWR for 1 cycle (e.g., at state 1215) to copy the values of the monitored cells to their shift paths, and by raising shiftWR for 11 cycles to shift the values of the monitored cells out of the WBR to the security engine (e.g., through states 1220, 1225, and 1230). For example, at state 1220, shiftWR can be raised to 1, and the Count can be increased. If the count equals 11, the shiftWR can be lowered to zero at state 1230, and then the exemplary diagram can proceed to state 1210. If the Count does not equal 11, the exemplary state can proceed back to state 1215.

Simultaneously, the FSM can sample HREADY and HTRANS[1:0] every cycle. While the transfer can be ongoing, HREADY can be 0 (see e.g., Appendix A) and the FSM can be in the Same Transfer state 1235. This can assure that only one snapshot can be taken for the transfer since snapshots can be taken only when the FSM can be in the New Request state 1250. When HREADY can be lowered, the transfer can be complete, and the FSM can proceed to the Transfer Complete state 1240. If the transfer can be for a non-sequential request, or can be the last transfer of a burst request, HTRANS[1:0] can transition to 00 for an idle bus cycle, or 10 for a new request. (See, e.g., Reference 25). The FSM can proceed to a Request Complete state 1245 for an idle bus cycle, or to a New Request state 1250 in for a new request. If the transfer can be part of a burst request and may not be the last transfer, HTRANS[1:0] can transition between 01b to add busy bus cycles, or 11b for more transfers. (See, e.g., Reference 25). The FSM can remain in the Transfer Complete state 1240 to avoid taking snapshots of other transfers in the request.

Exemplary WrapSAC 2.0 Security Engine

The security engine can program the wrappers with WS SEC on system boot and at runtime can verify AMBA transfers. The engine may not start snapshots, and may implement the exemplary programming of the FSM as shown in FIG. 5. The compactor and snapshot bus can modify the LUT, and its associated logic, when compared to the engine of the exemplary WrapSAC 1.0. (See, e.g., FIG. 6). The engine now can have an 11-bit buffer for each bus master to receive values of the monitored cells. The base and mask entries of the LUT can now be about 10 bits long to reflect the exemplary compactor. The LUT can now be indexed with Compact(haddr)[9:6][3:0]. Each bus master can have its own logic to check transfers, and the ctr may no longer be needed. The policy column of each bus master can be hardwired to its logic block. On a transfer, the engine can find the segment of the address and can return an undefined signal if the address may not be within the segment range. Otherwise, the engine can raise an allow signal if the transfer may not be restricted by the access control policy.

Exemplary WrapSAC 2.0 Performance, Power, and Area Overheads

The exemplary SoC DfT architecture can be modified according to an exemplary embodiment of the present disclosure as shown in FIG. 9. For example, the WBR 915 of the LEON3 wrapper 910 can be enhanced with the compactor, and short path, and can add the trigger FSM. The security engine can be modified as described below.

Exemplary Performance Overhead: the exemplary WrapSAC 2.0 can incur the same performance overhead as the exemplary WrapSAC 1.0 (e.g., about 10 cycles during programming) and does not impact the execution of the embedded firmware.

Exemplary Power and Area Overheads: The compactor, trigger FSM, and security engine can have area and power costs of about 10,920.9 $\mu m^2$ and about 11.3 mW, respectively. The overhead of the exemplary WrapSAC 2.0 can be evaluated on th the LEON3 processor. If the processor can be obtained unwrapped, the SoC integrator can add the FSM and the compactor when designing the wrapper, incurring area and power overheads of about 3.1% and about 3.6%, respectively. If the processor can already be wrapped, the SoC integrator can use an overwrapper to facilitate the exemplary WrapSAC 2.0. The WBR of the overwrapper can have wrapper cells of HADDR[31:28], HADDR[11:8], HWRITE, and the compactor and its C0 and C1 cells. The control logic can have the exemplary modifications shown in FIG. 11. With the overwrapper, the area and power overheads can be 3.7% and 4.2%, respectively.

Exemplary WrapSAC 2.0 Security Analysis

Figure 13:
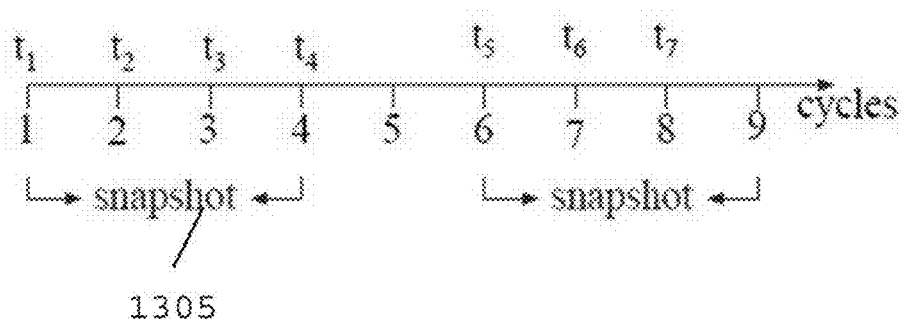
FIG. 13 is an exemplary diagram illustrating a security analysis for the exemplary system, method, and computer-accessible medium according to an exemplary embodiment of the present disclosure.

To facilitate detection of all extraction and hijacking attacks, the exemplary WrapSAC 2.0 can take a snapshot of one transfer for each burst request, and a snapshot of the transfer for each non-sequential request. The security effectiveness of the exemplary WrapSAC 2.0 can be evaluated using the example shown in the diagram shown in FIG. 13. For simplicity, it can be assumed that a snapshot operation 1305 can take about 4 cycles, and that there may only be one bus master that makes 7 transfers t1 to t7. The trigger FSM can notice transfer t1 while in the New Request state, and can start a snapshot at cycle 1. Transfers t2 through t4 can be unmonitored because the snapshot can end at cycle 4. At cycle 6, the trigger FSM can detect t5, and can start a snapshot that ends at cycle 9. Transfers t6 and t7 can be unmonitored. The exemplary WrapSAC 2.0 can take a snapshot of 2 out of the 7 transfers. If the transfers can be all for non-sequential requests, then the exemplary WrapSAC 2.0 can monitor 2 out of 7 requests. If transfers t1 to t4 can be for a 4-burst request, the exemplary WrapSAC 2.0 can successfully monitor that request, and can monitor 2 out of 4 requests in total. Thus, an effective way to represent the security effectiveness of the exemplary WrapSAC 2.0 can be to map monitored transfers according to their request types.

Figure 14:
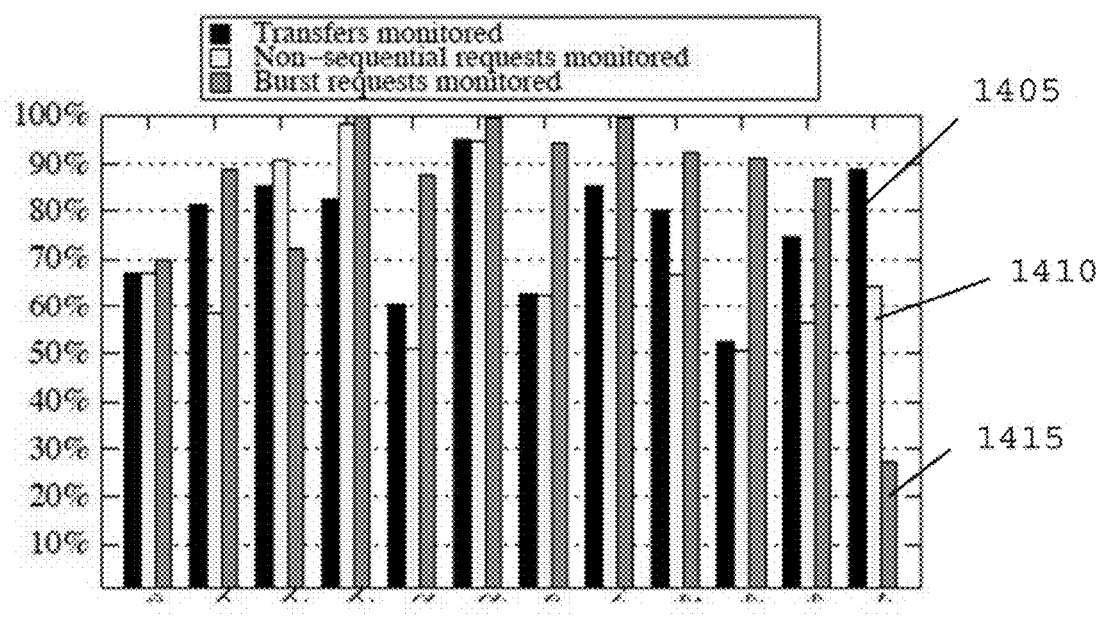
FIG. 14 is an exemplary chart illustrating the security effectiveness of the exemplary system, method, and computer-accessible medium according to an exemplary embodiment of the present disclosure.

The security effectiveness of the exemplary WrapSAC 2.0 can be evaluated. The benchmarks discussed above can be run for about 500 million instructions, and can track the number of transfers monitored and the request type each transfer belongs to. FIG. 14 shows a chart that illustrates the percentage of transfers monitored 1405 by the exemplary WrapSAC 2.0. On average, the exemplary WrapSAC 2.0 can monitor about 76.3% of transfers, about 30× more than the exemplary WrapSAC 1.0. FIG. 14 also shows an exemplary percentage of AHB non-sequential 1410 and burst requests monitored 1415. At worst, about 50.6% of non-sequential and about 69.75% of burst requests can be monitored. Several attack scenarios, and the probability that the exemplary WrapSAC 2.0 can detect them, can be considered.

Exemplary Attack using non-sequential requests: An attack may need only one AHB non-sequential request. For example, an attacker can write a 32-bit register (e.g., power-saving register, base address register) to modify the system configuration. The exemplary WrapSAC 2.0 can have at worst about 50.6% probability of detecting this attack. An attack can also need multiple non-sequential requests. For example, the attack can write to several non-sequential registers to modify SoC configuration. To detect such attack, the exemplary WrapSAC 2.0 may only monitor one of the restricted AHB requests, and can have 100% probability of detecting this attack.

Exemplary Attack using burst requests: An extraction attack can leak secret data such as 128-bit encryption. This attack utilizes one burst request. The exemplary WrapSAC 2.0 can have at worst about 69.75% probability of detecting this attack. In another instance, the attack can leak a bigger file such as binary or a DRM-protected media file. This attack utilizes several burst requests to restricted memory.

The exemplary WrapSAC 2.0 needs to monitor only one of those requests to detect the attack, and thus can have 100% probability of detecting it.

Thus, the exemplary WrapSAC 2.0 can detect all extraction and hijacking attacks that make at least 2 AHB requests. Such attacks can leak data such as DRM-protected media files, read proprietary binaries, or write malicious payloads that can be >16-B.

Exemplary WRAPSAC 3.0

The exemplary WrapSAC 2.0 can be enhanced with the exemplary WrapSAC-aware Quality-of-Service ("QoS") for the AMBA AHB. The QoS can ensure that the snapshot operation for a bus master can complete before the master can be granted the bus for a new AMBA request. The exemplary WrapSAC 3.0 may not modify the programming, snapshot operations, or security engine of the exemplary WrapSAC 2.0.

Exemplary WrapSAC 3.0 QoS

There can be several ways to implement the exemplary QoS:
1) The requested slave can insert 12 wait cycles (e.g., by raising HREADY) to facilitate snapshot completion. In case of a burst request, the wait states can be inserted intermittently;
2) The bus master can add idle states (e.g., by setting HTRANS to 00 when it can have highest priority) to facilitate snapshot of a transfer for a non-sequential request to complete, or add busy states (e.g., by setting HTRANS to 01) until completion of snapshot of a transfer for a burst request; and
3) The AMBA arbiter can delay granting the bus to a master for a new request until the current snapshot operation for the master can be complete.

Figure 15:
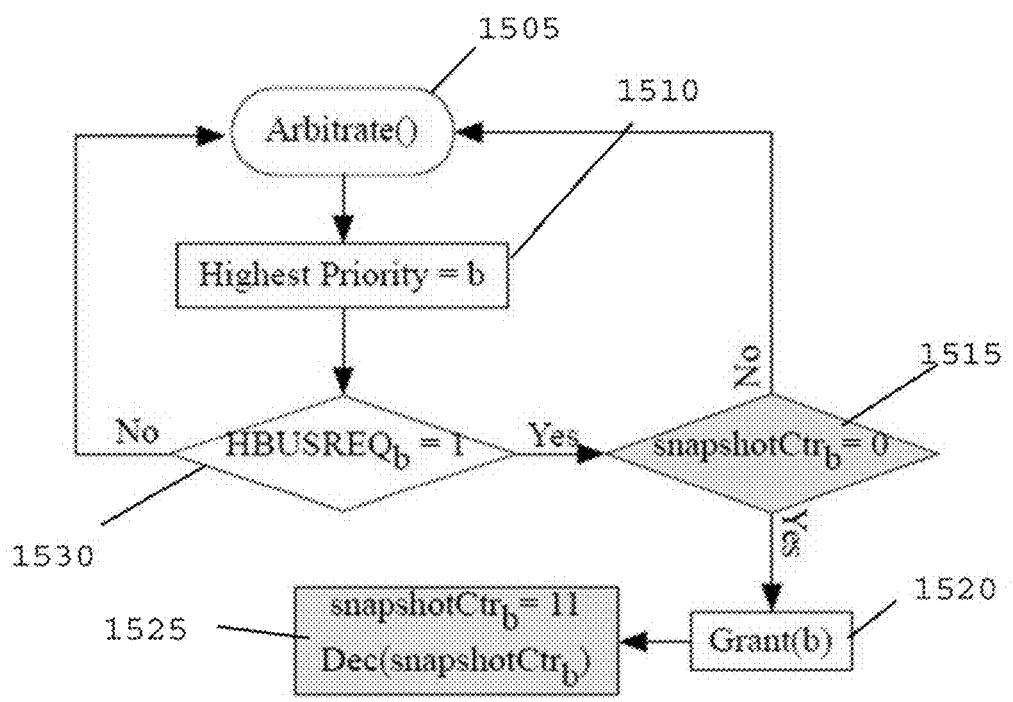
FIG. 15 is an exemplary flow diagram of an AMBA AHB Arbiter FSM with WrapSAC-aware QoS according to an exemplary embodiment of the present disclosure.

The first two exemplary approaches can benefit from modifications to untrusted 3PIP bus slaves and masters. The third exemplary approach can be practical because the modifications can be limited to the AMBA arbiter. FIG. 15 shows the AMBA AHB arbiter state machine with the QoS (e.g., shaded states can be added for the QoS) according to an exemplary embodiment of the present disclosure. For each bus master, the arbiter 1505 can have a 4-bit counter (e.g., snapshotCtr) that can saturate to 0. When a bus master can have highest priority 1510, the arbiter can grant the bus 1520 if the master's snapshotCtr can be 0 (e.g., procedure 1515). The arbiter can then initiate snapshotCtr 11 and decrement (e.g., procedure 1525) it by 1 every subsequent cycle (e.g., Dec(snapshotCtr)). Otherwise, the bus master may not be granted (e.g., procedure 1530) the bus and the bus can be re-arbitrated the next cycle.

Exemplary WrapSAC 3.0 Performance, Power, and Area Overheads

The exemplary WrapSAC-aware QoS can be added to the AMBA AHB arbiter of the exemplary WrapSAC 2.0, and can run all benchmarks for at most 500 million instructions.

Figure 16:
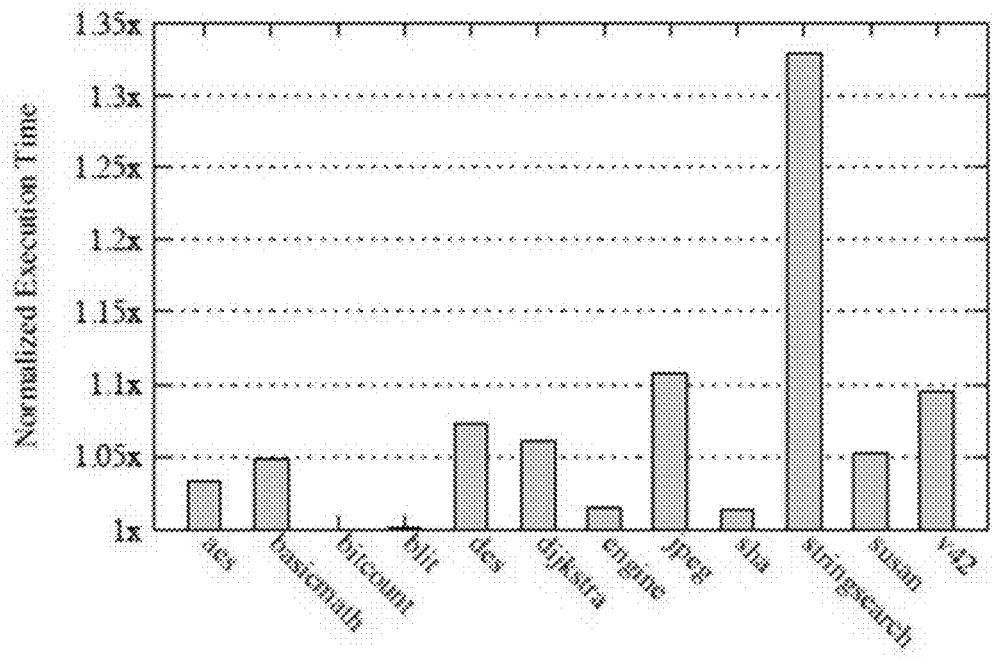
FIG. 16 is an exemplary chart illustrating the normalized execution time of the exemplary system, method, and computer-accessible medium according to an exemplary embodiment of the present disclosure.

Exemplary Performance Overhead: During programming, the exemplary WrapSAC 3.0 can incur the same performance overhead as the exemplary WrapSAC 2.0 (e.g., approximately 10 cycles). At runtime, the exemplary WrapSAC 3.0 can buffer requests until outstanding snapshots can be complete, delaying firmware execution. FIG. 16 shows a chart that illustrates the normalized execution time of the benchmarks of the exemplary WrapSAC 3.0 when compared to their execution without the exemplary WrapSAC. On average, the exemplary WrapSAC 3.0 can incur 6.8% performance overhead. The stringsearch benchmark may have the worst performance overhead at about 32.7%. The benchmark can use the Boyer-Moore string search procedure (see, e.g., Reference 41) and can make several non-sequential requests to 4-byte words at the beginning stages of the application to set a pre-processing table for the procedure. Those non-sequential requests can amount to about 87.5% of the total overhead.

Exemplary Area and Power Overheads: The QoS for the exemplary WrapSAC 3.0 can incur area and power overheads of about 1,896.9 $\mu m^2$ and about 0.26 mW, respectively, to the baseline AMBA AHB arbiter. When taking into consideration the overheads for the exemplary WrapSAC 2.0 components, the exemplary WrapSAC 3.0 can incur area and power overheads of about 3.6% and about 3.8%, respectively, to the LEON3 processor if the overwrapper may not be used, and about 4.2% and about 4.3%, respectively, if the overwrapper can be used.

Exemplary WrapSAC 3.0 Security Analysis

The exemplary WrapSAC 3.0 can meet the security guarantees of the exemplary WrapSAC 2.0, and can take a snapshot of one transfer for each AMBA AHB request. A bus master can make two AMBA AHB successive transfers t1 and t2. It can be assumed that the trigger FSM (e.g., from the exemplary WrapSAC 2.0) can take a snapshot of transfer t1. If t1 can be the transfer of a non-sequential request, the bus can be re-arbitrated to determine the next highest priority bus master. (See, e.g., Reference 25). If the bus master for t1 can still be highest priority, and its snapshotCtr can be 0, it can grant the bus and transfer t2 of the new request can proceed. Otherwise, it may not grant the bus, and it can be moved back in the priority list (e.g., according to the arbitration policy). If t1 can be a transfer of a burst request, the arbiter can either grant the bus until the burst can be complete and re-arbitrate, or can grant the bus for a fixed length and re-arbitrate. (See, e.g., Reference 25). In this exemplary scenario, the remaining transfers can form a new request with undefined burst length. (See, e.g., Reference 25). If t1 and t2 can be part of the same burst request, t2 can proceed without being stalled. This can maintain the procedure of the trigger FSM to take the snapshot of one transfer (t1) of a burst request. If t2 can be for a new request, the bus can be re-arbitrated and the QoS can verify that snapshotCtr can be 0 before granting the bus. In all instances where transfer t2 belongs to a new request, the bus can be re-arbitrated according to the AMBA protocol, and the QoS can verify snapshotCtr can be 0. This can assure that the snapshot of t1 can be complete before t2 starts, which can facilitate the trigger FSM to take a snapshot of t2.

Exemplary Scalability of WrapSAC

The exemplary compactor can be specific to the memory map in Table I. The scalability of the exemplary WrapSAC for different memory maps can be evaluated. As discussed above, the exemplary WrapSAC can expect AHB memory segments to be ≥1-KB.

Figure 17:
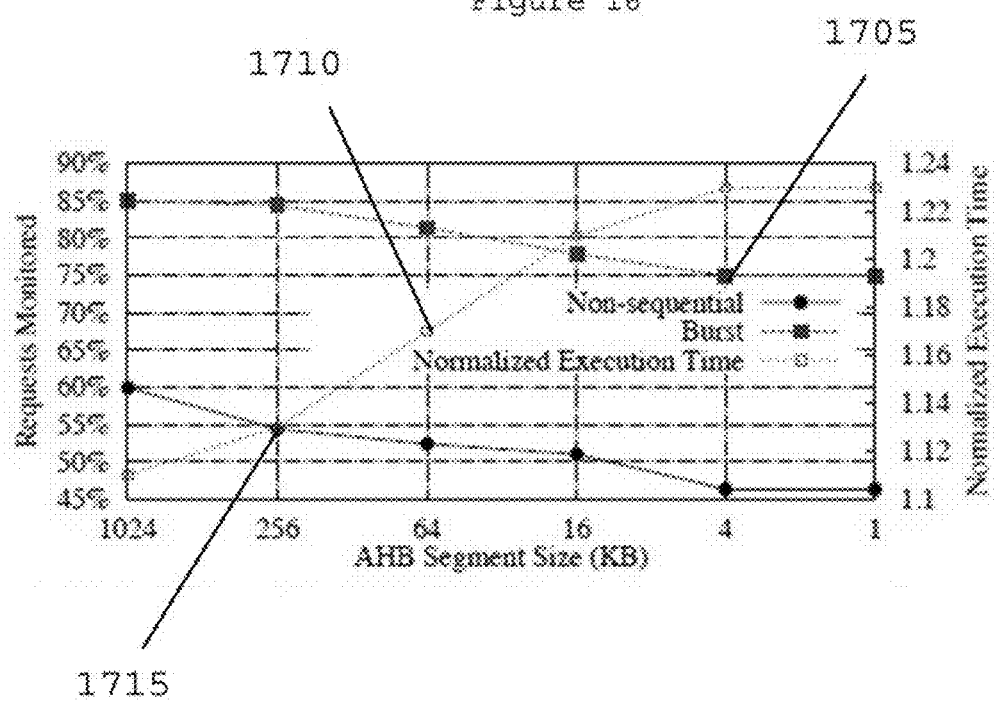
FIG. 17 is an exemplary chart illustrating the scalability of the exemplary system, method, and computer-accessible medium for different memory maps according to an exemplary embodiment of the present disclosure.

For simplicity, it can be assumed that a memory map can have no uniform bits, and its APB segments can be about 256-B. Consider, for example, a memory map with about 1-KB AHB segments, bits HADDR[7:0] can be don't cares, and a snapshot can take 27 cycles. FIG. 17 shows a chart that illustrates the percentage of AHB burst (e.g., line 1705) and non-sequential (e.g., line 1715) requests (e.g., left y-axis) that the exemplary WrapSAC 2.0 can monitor as a function of AHB segment size. In case AHB segments can be <16-KB, the exemplary WrapSAC 2.0 may not monitor about 50% of non-sequential requests, and may not guarantee detection of attacks that make multiple requests. The exemplary WrapSAC 3.0 can be used instead. FIG. 17 also shows the normalized execution time (e.g., line 1710) of the exemplary WrapSAC 3.0 (e.g., right y-axis) as a function of AHB memory segment size. In the worst case (e.g., 1-KB segments), the exemplary WrapSAC 3.0 can incur an average performance overhead of about 23%.

Exemplary Reuse of WrapSAC

Exemplary Detecting Stack-Based Code Injection Attacks: The exemplary WrapSAC 3.0 can be used to detect code injection attacks via stack-based buffer overflow. A stack-based code injection attack can leverage the ability to execute from the stack segment of the RAM. (See, e.g., Reference 43). To detect code fetch from the stack, the exemplary WrapSAC 3.0 can monitor wrapper cell of HPROT[0] (see e.g., Appendix A and Reference 25) in addition to HWRITE and HADDR[31:0]. The security policy table can have a new bit to indicate if a memory segment can be executable. On a transfer, the security engine can verify HPROT[0] in case of a transfer to the stack segments to detect the attack.

Exemplary Isolating Privilege and User-level Code/Data: If the embedded system can have an RTOS, one can want to isolate RTOS code and data from the rest of the system. The exemplary WrapSAC 3.0 can be enhanced to monitor the wrapper cell of HPROT[1] to indicate if the transfer can be for a privileged or user-level access. (See e.g., Appendix A).

For memory maps with AHB memory segments <1-KB, the exemplary WrapSAC can monitor each transfer. In the exemplary worst case, a segment can be the size of a cache line, about 16-B in the exemplary case, and a snapshot operation can take about 30 cycles. The trigger FSM can be modified to take a snapshot of as many transfers as possible (e.g., instead of one transfer per burst request). With this exemplary configuration, the exemplary WrapSAC 2.0 can take a snapshot of about 36% of the transfers. Moreover, it may not monitor burst requests because it may not be able to take a snapshot of all transfers within a request. The exemplary WrapSAC 2.0 thus may not be suitable if AHB segments can be <1-KB. The exemplary WrapSAC 3.0 can also be modified to take a snapshot of each transfer and using about 16-B AHB segments. This can lead to an average performance overhead of about 68.5%. This overhead may not be too much if the embedded system can run a performance-bound application.

An attacker may be able to bypass the exemplary WrapSAC 3.0 using locked transfers. When a bus master can be granted the bus and HLOCKx=1 can be raised, the bus master can make transfers for several requests without bus re-arbitration. (See e.g., Appendix A). Therefore, the QoS may not able to verify that the snapshot for a transfer of the previous request can be completes, which can reduce the exemplary WrapSAC 3.0 to the exemplary WrapSAC 2.0. One way to mitigate this attack can be to enhance the AHB arbiter with a fairness QoS that can limit how long a master can lock the bus. (See, e.g., Reference 18).

The exemplary WrapSAC can repurpose the DfT of SoCs to detect hijacking and extraction attacks on embedded systems. This exemplary approach can incur small area and power overheads. Three exemplary iterations of the exemplary the exemplary WrapSAC (1.0-3.0) can be described. The exemplary WrapSAC 1.0 can provide limited security but can make negligible modifications to the DfT infrastructure. With low-overhead enhancements to the test wrapper and a new serial bus to the DfT, the exemplary WrapSAC 2.0 can detect common hijacking and extraction attacks. The exemplary WrapSAC 3.0 can build on the exemplary WrapSAC 2.0 architecture and use the exemplary WrapSAC-aware QoS on the system bus to detect all attacks while incurring 6.8% overhead on average. For embedded systems used in safety-critical infrastructures, such as power plants, or in consumer electronics that store user personally identifiable information, the exemplary WrapSAC 3.0 can be used to guarantee attack detection. For embedded systems used in less critical devices, such as office equipment, the exemplary WrapSAC 2.0 can be configured to prevent theft of proprietary firmware or loading of arbitrary code. Though designed using the AMBA protocol and the IEEE 1500 standard, the exemplary WrapSAC can also be designed for other system buses, such as the Open Core Protocol ("OCP") and L3 that prevent boundary crossing on burst requests, and other design for test standards with boundary wrappers such as the IEEE 1149.1 ("JTAG").

EXEMPLARY APPENDIX A

Exemplary Advanced Microcontroller Bus Architecture

The Advanced Microcontroller Bus Architecture ("AMBA") is an open-standard system bus protocol for SoCs. (See, e.g., Reference 25). AMBA defines three buses: i) the Advanced High Performance Bus ("AHB"), a system bus to connect IP cores to high-throughput and high-performance memory-mapped devices such as external ROM, RAM, and off-chip interfaces, ii) the Advanced System Bus ("ASB"), an AHB alternative system bus when high-performance may not be needed, and iii) the Advanced Peripheral Bus ("APB"), an optimized bus for low-power peripherals. The AHB protocol can facilitate bus widths of about 8, 16, 32, 64, 128, 256, 512, or 1024 bits. A 32-bit bus width can be used. Bus masters connected to the AHB can use an AHB-APB bridge to access APB slaves. The bridge can act as the only bus master to the APB, a slave to the AHB, and can translate AHB requests to APB-relevant signals. An AHB bus transfer can be a read or write memory operation that can take one or several cycles. An AHB request can have one transfer (e.g., non-sequential request) or multiple transfers (e.g., burst request). The APB may not support burst requests. The AHB can have an arbiter that can pipeline the transfers, and can determine which master can be granted access to the bus, a decoder to notify bus slaves of transfers and to translate addresses, read and write data multiplexers, and address and control multiplexers to route transfer signals between bus masters and slaves.

Figure 18:
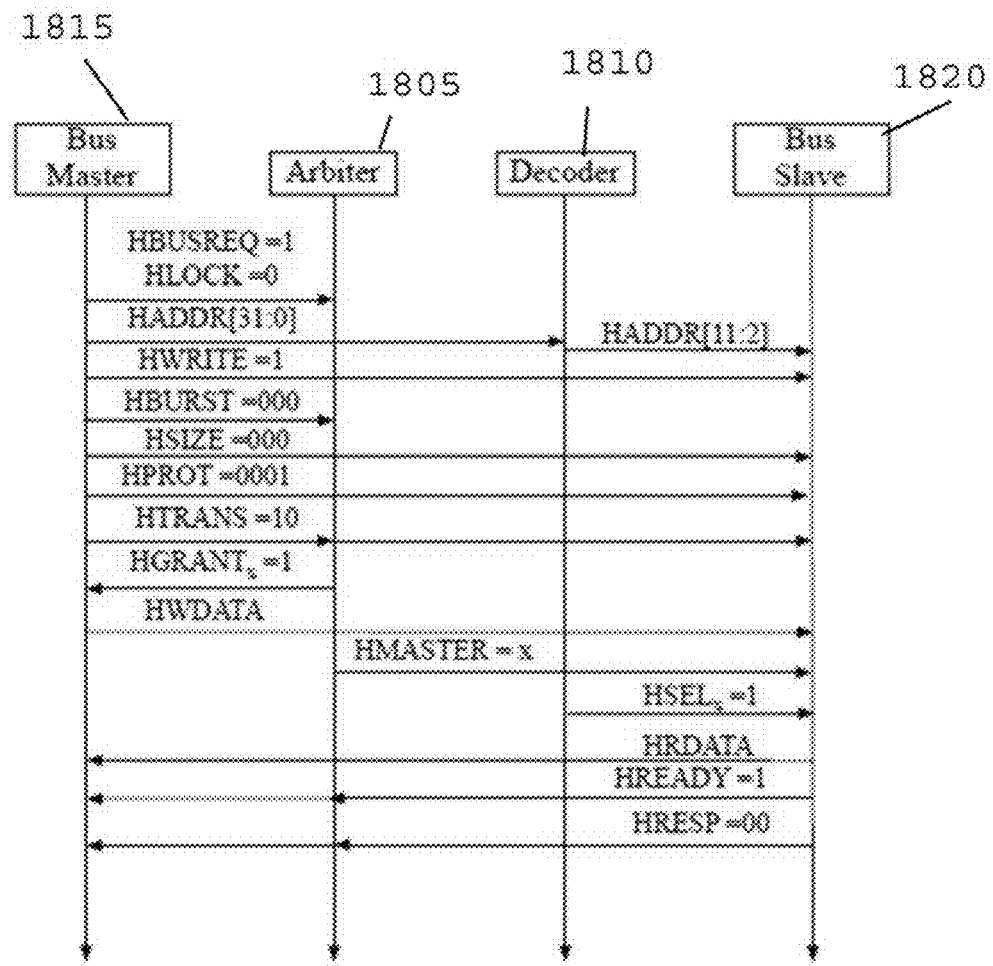
FIG. 18 is an exemplary diagram illustrating the AMBA protocol for a transfer according to an exemplary embodiment of the present disclosure.

FIG. 18 shows a timing diagram of an AMBA transfer. A transfer can have 2 stages: i) a single-cycle address stage, where the arbiter 1805 and decoder 1810 can set control signals to AMBA slaves to notify the transfer, and ii) a data stage where the selected slave can process the transfer. When a bus master 1815 needs to make a transfer, it can raise its HBUSREQx to notify the arbiter. If the bus master 1815 can have several indivisible transfers, it can raise its HLOCKx. Simultaneously, the bus master 1815 can set the address via HADDR[31:0] and transfer type (e.g., read/write) via the HWRITE signal. The bus master 1815 can also set several control signals including HBURST[2:0] for the number of transfers in case of a burst request, SIZE[2:0] for the size of the transfer, HPROT[3:0] if the transfer can be cacheable (e.g., HPROT[3]), bufferable (HPROT[2]), privileged (HPROT[2]), and for a data or code fetch (HPROT[0]), HTRANS[1:0] if the transfer can be for an idle bus cycle (e.g., 00), a busy cycle to delay a burst request (e.g., 01), a non-sequential transfer (e.g., 10), or a sequential transfer as part of a burst request (e.g., 10). When the arbiter 1805 can grant the bus to the bus master 1815, it can raise the HGRANTx signal and use the HMASTER signal to notify bus slaves 1820 of the current bus master 1815. In case of a write transfer (e.g., HWRITE=1), the bus master 1815 can write the data in HWDATA[31:0]. The decoder 1810 can select the slave using the HSELx signal. When the bus slave 1820 notices its HSELx can be raised, it can check HADDR[31:0] and HWRITE to process the transfer. In case of read transfer, the bus slaves 1820 may not set the data in the HRDATA[31:0] signal. While the transferring can be performed, the bus slave 1820 can keep the HREADY signal low, and can raise it when the transfer can be complete. The bus slave 1820 can also set the HRESP[1:0] signal to indicate if the transfer can be successful (e.g., 00), erroneous (e.g., 01), should be retried (e.g., 10), or incomplete (e.g., 11). If the completed transfer can be for a non-sequential request, the bus can be re-arbitrated. If the transfer can be part of a burst request, the bus master 1815 can update HADDR[31:0], HTRANS[1:0], and HWDATA[31:0] (e.g., in case of a write), for the other transfers of the request.

EXEMPLARY APPENDIX B

Exemplary IEEE 1500 Standard

Figure 19A:
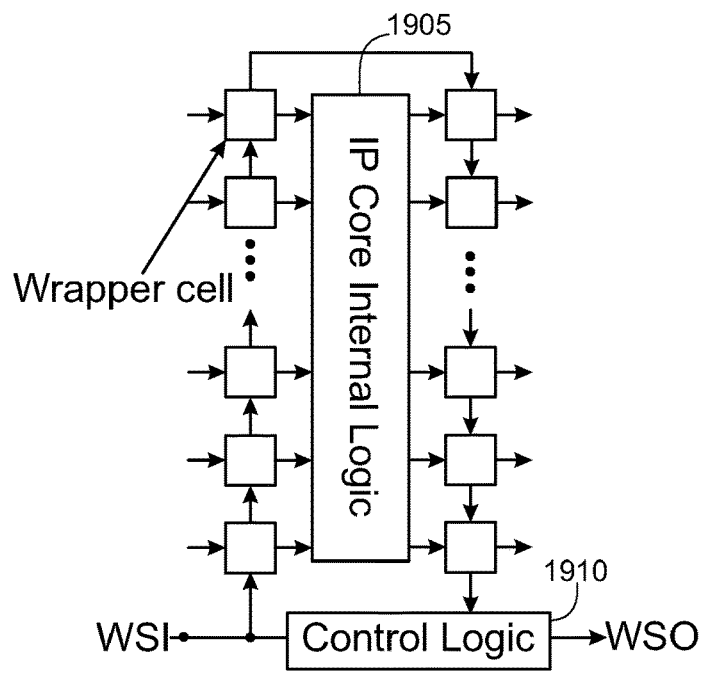
FIGS. 19A-19C are exemplary schematic diagrams for exemplary components used by the exemplary IEEE 1500 standard according to an exemplary embodiment of the present disclosure.

The IEEE 1500 standard is a plug-and-play test reuse architecture for embedded IP cores in SoCs. (See, e.g., Reference 24). Any IP core that complies with the standard can be seamlessly integrated to the SoC test architecture. FIG. 19A shows an example of an SoC IP core that complies with the standard. The standard defines a wrapper to observe and control the IP core 1905 during post-silicon testing. The wrapper can be composed of a WBR and a control logic 1910.

Figure 19B:
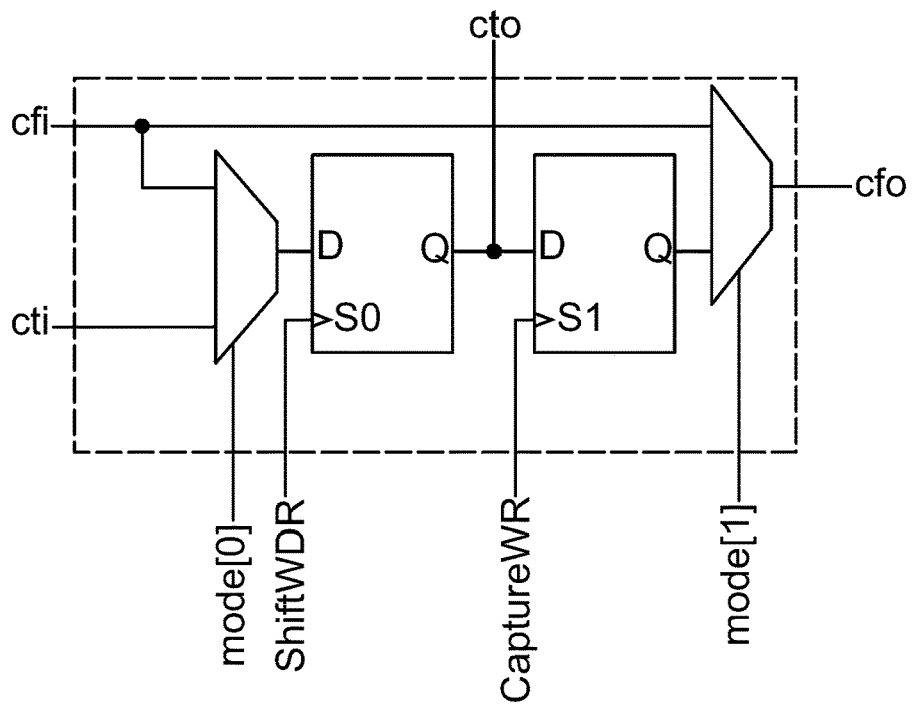

The WBR can be a shift register around the IP core 1905. It can include IEEE 1500-compliant wrapper cells connected to the input and output terminals of the IP core 1905 to form a scan chain. FIG. 19B shows an example of an exemplary IEEE 1500 wrapper cell connected to an output terminal of the IP core. The wrapper cell can have a shift path for test vectors via the core test input ("cti") and the core test output ("cto") ports. The wrapper cell can also have a functional (e.g., off-shift) formed by the core functional input ("cfi") and output ("cfo") ports. The off-shift path connects to the IP terminals and the SoC user-defined logic ("UDL"). Table III below shows the wrapper cell signals for each operation:
1) Capture copies data from cfi or cfo to storage element 0 (S0). The operation can be used to copy values of the input or output terminals of the IP core to the shift path of the WBR;
2) Shift moves data from S0 to cto and from cti to S0. The operation can move test vectors in an out of the WBR; and
3) Update copies data from S0 to storage element 1 (S1) and to cfo. The operation copies data from the wrapper cell shift path to its functional path.

TABLE III

IEEE 1500 Wrapper Cell Operations and Relevant Signals

| Operation | mode[0] | shiftWDR | updateWDR | mode[1] |
|---|---|---|---|---|
| Capture | 0 | 1 | 1 | 0 |
| Shift | 1 | clk | 1 | 0 |
| Update | X | 0 | 0 | 1 |

Figure 19C:
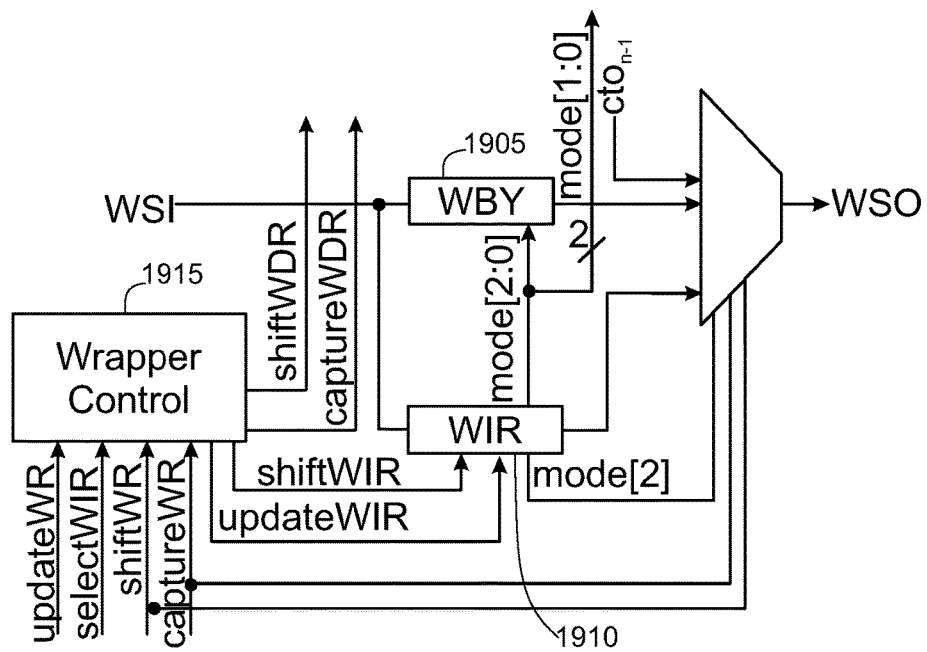

FIG. 19C shows the exemplary wrapper control logic. The standard defines a WSI and WSO to shift test vectors and instruction opcodes in and out of the wrapper. Wrapper parallel input ("WPI") and wrapper output ("WPO") ports can be optional. The wrapper bypass register ("WBY") 1905 gives provide a direct path from WSI to WSO or from WPI to WPO. The WIR 1910 can store and decode the wrapper instruction. The wrapper control block 1915 can be a FSM that can facilitate the operations of the wrapper. The FSM can connect to a wrapper serial control ("WSC") port that can drive the following signals from the test controller: i) selectWIR to program the WIR 1910, ii) shiftWR to shift the WIR opcodes (e.g., when selectWIR can be raised) or data out of the wrapper cells, iii) captureWR to set the capture operation, and iv) updateWR to update the new WIR instruction (e.g., when selectWIR can be raised) or to update the data in the wrapper cells.

The IEEE 1500 standard can define 3 instructions: i) WS BYPASS to disable testing when the IP core can be in functional mode, ii) WS EXTEST to test the UDL, and iii) Wx INTEST to test the internal logic of the IP core. Table IV below shows the wrapper signals relevant to specific instructions.

TABLE IV

IEEE 1500 Standard Default Instructions and Relevant Signals

| Instruction | mode[2] | selectWIR | WPSO |
|---|---|---|---|
| WS_BYPASS | 0 | 0 | WBY |
| WS_EXTEST | 1 | 0 | cto_n-1 |
| Wx_INTEST | 1 | 0 | cto_n-1 |
| X | X | 1 | WIR |

Figure 20:
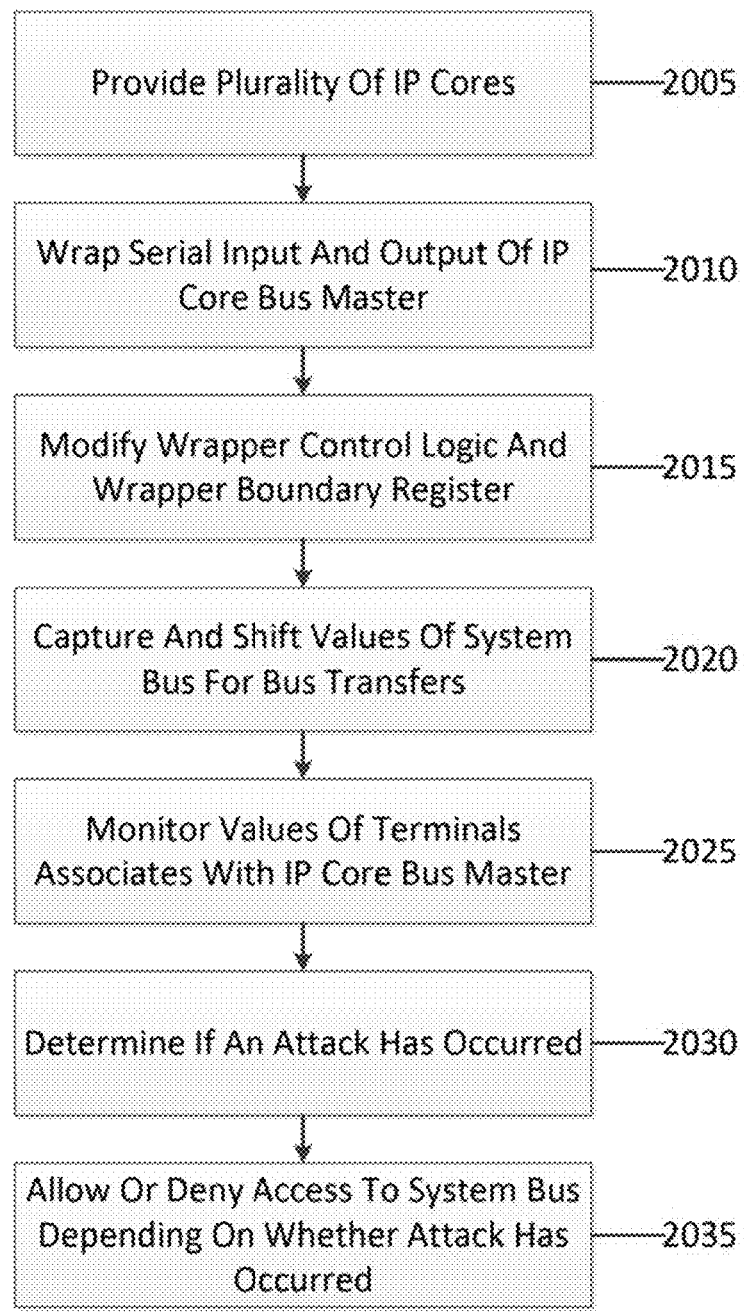
FIG. 20 is a flow diagram of an exemplary method for wrapping an intellectual property core bus master according to an exemplary embodiment of the present disclosure.

FIG. 20 shows a flow diagram of an exemplary method for wrapping an intellectual property core bus master according to an exemplary embodiment of the present disclosure. For example, at procedure 2005, a plurality of IP cores can be provided. At procedure 2010, the serial input and serial output of the IP core bus master can be wrapped. Wrapper control logic and a wrapper boundary register of the IP core bus master can be can be modified at procedure 2015. At procedure 2020, values of a system bus for bus transfers associated with the IP core bus master and the IP cores can be captured and/or shifted (e.g., independent of one another). At procedure 2025, values of a terminal associated with the IP core bus master can be monitored. At procedure 2030, a determination can be made as to whether an attack has occurred, and at procedure 2035, access can be allowed or denied to the system bus based on whether an attack has occurred.

Figure 21:
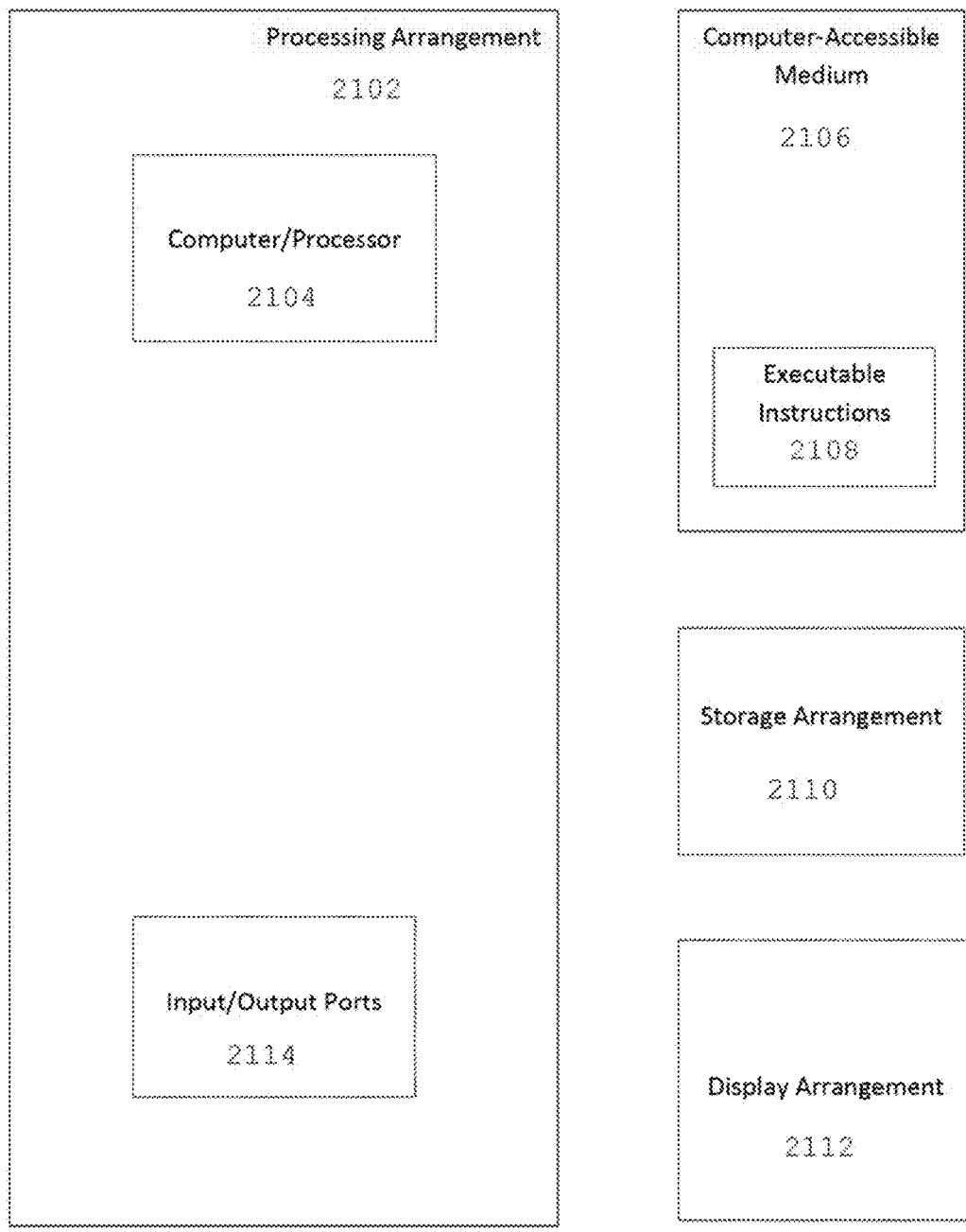
FIG. 21 is an illustration of an exemplary block diagram of an exemplary system in accordance with certain exemplary embodiments of the present disclosure.

FIG. 21 shows a block diagram of an exemplary embodiment of a system according to the present disclosure. For example, exemplary procedures in accordance with the present disclosure described herein can be performed by a processing arrangement and/or a computing arrangement 2102. Such processing/computing arrangement 2102 can be, for example entirely or a part of, or include, but not limited to, a computer/processor 2104 that can include, for example, one or more microprocessors, and use instructions stored on a computer-accessible medium (e.g., RAM, ROM, hard drive, or other storage device).

As shown in FIG. 21, for example a computer-accessible medium 2106 (e.g., as described herein above, a storage device such as a hard disk, floppy disk, memory stick, CD-ROM, RAM, ROM, etc., or a collection thereof) can be provided (e.g., in communication with the processing arrangement 2102). The computer-accessible medium 2106 can contain executable instructions 2108 thereon. In addition or alternatively, a storage arrangement 2110 can be provided separately from the computer-accessible medium 2106, which can provide the instructions to the processing arrangement 2102 so as to configure the processing arrangement to execute certain exemplary procedures, processes, and methods, as described herein above, for example.

Further, the exemplary processing arrangement 2102 can be provided with or include an input/output arrangement 2114, which can include, for example a wired network, a wireless network, the internet, an intranet, a data collection probe, a sensor, etc. As shown in FIG. 21, the exemplary processing arrangement 2102 can be in communication with an exemplary display arrangement 2112, which, according to certain exemplary embodiments of the present disclosure, can be a touch-screen configured for inputting information to the processing arrangement in addition to outputting information from the processing arrangement, for example. Further, the exemplary display 2112 and/or a storage arrangement 2110 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.

[1] G. Hernandez, O. Arias, D. Buentello, and Y. Jin, "Smart Nest Thermostat: A Smart Spy in Your Home," Black Hat USA, August 2014.

[2] D. Halperin, T. S. Heydt-Benjamin, B. Ransford, S. S. Clark, B. Defend, W. Morgan, K. Fu, T. Kohno, and W. H. Maisel, "Pacemakers and Implantable Cardiac Defibrillators: Software Radio Attacks and Zero-Power Defenses," in 2008 IEEE Symposium on Security and Privacy, May 2008, pp. 129-142.

[3] M. Shkatov and T. Kohlenberg, "UART Thou Mad? An Introduction to the UART Hardware Interface," Black Hat USA, July 2013.

[4] S. Lee and S. Kim, "Hacking, Surveilling, and Deceiving Victims on Smart TV," Black Hat USA, July 2013.

[5] K. Koscher, A. Czeskis, F. Roesner, S. Patel, T. Kohno, S. Checkoway, D. McCoy, B. Kantor, D. Anderson, H. Shacham, and S. Savage, "Experimental Security Analysis of a Modern Automobile," in 2010 IEEE Symposium on Security and Privacy, May 2010, pp. 447-462.

[6] C. Miller and C. Valasek, "A Survey of Remote Automotive Attack Surfaces," Black Hat USA, August 2014.

[7] E. Byres and J. Lowe, "The Myths and Facts Behind Cyber Security Risks for Industrial Control Systems," in Proceedings of the VDE Kongress, vol. 116, 2004.

[8] A. Francillon and C. Castelluccia, "Code injection attacks on harvard-architecture devices," in ACM 15th Conference on Computer and Communications Security, October 2008, pp. 15-26.

[9] J.-P. Diguet, S. Evain, R. Vaslin, G. Gogniat, and E. Juin, "NOC-centric Security of Reconfigurable SoC," in 1st IEEE International Symposium on Networks-on-Chip, May 2007, pp. 223-232.

[10] S. Checkoway, D. McCoy, B. Kantor, D. Anderson, H. Shacham, S. Savage, K. Koscher, A. Czeskis, F. Roesner, and T. Kohno, "Comprehensive Experimental Analyses of Automotive Attack Surfaces," in 20th USENIX Conference on Security, August 2011, pp. 6-6.

[11] T. Goodspeed and A. Francillon, "Half-blind Attacks: Mask ROM Bootloaders Are Dangerous," in 3rd USENIX Conference on Offensive Technologies, 2009, pp. 6-6.

[12] A. Silberschatz, P. B. Galvin, and G. Gagne, Operating system concepts. Wiley, December 2012, vol. 8.

[13] C. Park, J. Lim, K. Kwon, J. Lee, and S. L. Min, "Compiler-assisted Demand Paging for Embedded Systems with Flash Memory," in 4th ACM International Conference on Embedded Software, October 2004, pp. 114-124.

[14] "Memory Protection Unity (MPU)—ARM Information Center," http://infocenter.arm.com/help/indexjsp?topic=/com.arm.doc.ddi0290g/Behjcgbj.html.

[15] J. Porquet, A. Greiner, and C. Schwarz, "NoC-MPU: A Secure Architecture for Flexible Co-hosting on Shared Memory MPSoCs," in 2011 IEEE Design, Automation Test in Europe Conference Exhibition, March 2011, pp. 1-4.

[16] P. Cotret, J. Crenne, G. Gogniat, and J.-P. Diguet, "Bus-based MPSoC Security through Communication Protection: A Latency-efficient Alternative," in 20th Annual IEEE International Symposium on Field-Programmable Custom Computing Machines, April 2012, pp. 200-207.

[17] ARM, "ARM Security Technology Building a Secure System using TrustZone Technology," 2009.

[18] L.-W. Kim and J. Villasenor, "A System-On-Chip Bus Architecture for Thwarting Integrated Circuit Trojan Horses," IEEE Transactions on Very Large Scale Integration (VLSI) Systems, vol. 19, no. 10, pp. 1921-1926, October 2011.

[19] K. Eldefrawy, G. Tsudik, A. Francillon, and D. Perito, "SMART: Secure and Minimal Architecture for (Establishing Dynamic) Root of Trust," in 19th Annual Network & Distributed System Security Symposium, February 2012.

[20] J. Noorman, P. Agten, W. Daniels, R. Strackx, A. V. Herrewege, C. Huygens, B. Preneel, I. Verbauwhede, and F. Piessens, "Sancus: Low-cost Trustworthy Extensible Networked Devices with a Zero-software Trusted Computing Base," in 22nd USENIX Security Symposium, August 2013, pp. 479-498.

[21] P. Koeberl, S. Schulz, A.-R. Sadeghi, and V. Varadharajan, "TrustLite: A Security Architecture for Tiny Embedded Devices," in ACM 9th European Conference on Computer Systems, April 2014, pp. 10:1-10:14.

[22] M. Simpson, B. Middha, and R. Barua, "Segment Protection for Embedded Systems Using Run-time Checks," in 2005 International Conference on Compilers, Architectures and Synthesis for Embedded Systems, September, pp. 66-77.

[23] N. Cooprider, W. Archer, E. Eide, D. Gay, and J. Regehr, "Efficient Memory Safety for TinyOS," in 5th ACM Conference on Embedded Networked Sensor Systems, November 2007, pp. 205-218.
[24] F. d. Silva, T. McLaurin, and T. Waayers, The Core Test Wrapper Handbook: Rationale and Application of IEEE Std. 1500. Springer, September 2006.
[25] ARM, "AMBA Specification Rev 2.0," ARM Limited, 1999.
[26] R. Sinha, P. Roop, and S. Basu, Correct-by-Construction Approaches for SoC Design. Springer, September 2013.
[27] Specification, Open Core Protocol and Volume, I, "Release 2.0," 2003. [28] I. Microelectronics, "Coreconnect bus architecture," 1999.
[29] M. Sharma and D. Kumar, "Wishbone bus Architecture-A Survey and Comparison," arXiv preprint arXiv:1205.1860, 2012.
[30] J. Gaisler, S. Habinc, and E. Catovic, "GRLIB IP Library Users Manual," Aeroflex Gaisler, 2010.
[31] Y.-L. S. Lin, Essential issues in SOC design. Springer, November 2006.
[32] A. Cui, M. Costello, and S. Stolfo, "When Firmware Modifications Attack: A Case Study of Embedded Exploitation," in 20th Annual Network & Distributed System Security Symposium, February 2013.
[33] Y. Zhou and X. Jiang, "Dissecting Android Malware: Characterization and Evolution," in 2012 IEEE Symposium on Security and Privacy, May 2012, pp. 95-109.
[34] J. Gaisler, S. Habinc, and E. Catovic, "GRLIB IP Core Users Manual," Aeroflex Gaisler, 2014.
[35] M. R. Guthaus, J. S. Ringenberg, D. Ernst, T. M. Austin, T. Mudge, and R. B. Brown, "MiBench: A Free, Commercially Representative Embedded Benchmark Suite," in 4th IEEE International Workshop on Workload Characterization, December 2001, pp. 3-14.
[36] A. Malik, B. Moyer, and D. Cermak, "A Low Power Unified Cache Architecture Providing Power and Performance Flexibility (Poster Session)," in 2000 International Symposium on Low Power Electronics and Design, July 2000, pp. 241-243.
[37] Cadence, "Encounter User Guide," March 2008.
[38] J. Stine, J. Chen, I. Castellanos, G. Sundararajan, M. Qayam, P. Kumar, J. Remington, and S. Sohoni, "FreePDK v2.0: Transitioning VLSI Education Towards Nanometer Variation-Aware Designs," in 2009 IEEE International Conference on Microelectronic Systems Education, July 2009, pp. 100-103.
[39] M. L. Bushnell and V. D. Agrawal, Essentials of Electronic Testing for Digital, Memory & Mixed-Signal VLSI Circuits. Springer, December 2004.
[40] N. A. Touba, "Survey of Test Vector Compression Techniques," IEEE Design and Test of Computers, vol. 23, no. 4, pp. 294-303, July 2006.
[41] Z. Galil, "On Improving the Worst Case Running Time of the Boyer-Moore String Matching Algorithm," Commuinications of the ACM, vol. 22, no. 9, pp. 505-508, September
[42] Y. Jin and Y. Makris, "Hardware Trojan detection using path delay fingerprint," in IEEE International Workshop on Hardware-Oriented Security and Trust, August 2008, pp. 51-57.
[43] Z. Shao, C. Xue, Q. Zhuge, M. Qiu, B. Xiao, and E.-M. Sha, "Security Protection and Checking for Embedded System Integration Against Buffer Overflow Attacks via Hardware/Software," IEEE Transactions on Computers, vol. 55, no. 4, pp. 443-453, April 2006.

What is claimed is:

1. A system for wrapping at least one intellectual property (IP) core bus master, comprising:
   a plurality of IP cores associated with the at least one IP core bus master;
   a plurality of terminals coupled to the at least one IP core bus master wherein the terminals include at least one HADDR and at least one HWRITE;
   a plurality of wrapper cells associated with the terminals;
   a wrapper module connected to a serial input of the at least one IP core bus master and a serial output of the at least one IP core bus master, wherein the wrapper module is configured to monitor a plurality of values of at least one of the at least one HADDR and the at least one HWRITE; and
   a computer hardware arrangement configured to determine if at least one attack on the system bus has occurred based on the values,
   wherein the wrapper module is configured to (i) capture and shift the values of a system bus for a plurality of bus transfers associated with the at least one IP core bus master and the IP cores, and (ii) deny access to the system bus if the computer hardware arrangement determines that the at least one attack has occurred.

2. The system of claim 1, wherein the wrapper module is further configured to modify a wrapper control logic and a wrapper boundary register of the at least one IP core bus master.

3. The system of claim 1, wherein the wrapper module is further configured to allow access to the system bus if (i) the computer hardware arrangement determines that the at least one attack has not occurred, and (ii) the wrapper module has completed monitoring the values.

4. The system of claim 1, wherein the wrapper module is further configured to independently capture and shift the values of the system bus.

5. The system of claim 1, wherein the IP cores include at least one of (i) memory access controllers, (ii) processors, (iii) image processors, or (iv) input/output controllers.

6. The system of claim 1, wherein the wrapper module includes an architecture from a previously-generated design-for-test architecture associated with the IP cores.

7. A non-transitory computer-accessible medium having stored thereon computer-executable instructions for wrapping at least one intellectual property (IP) core bus master, wherein, when a computer arrangement executes the instructions, the computer arrangement is configured to perform procedures comprising:
   providing a plurality of IP cores associated with the at least one IP core bus master;
   wrapping a serial input of the at least one IP core bus master and a serial output of the at least one IP core bus master using a wrapper module;
   monitoring a plurality of values of a plurality of terminals associated with the at least one IP core bus master, wherein the terminals include at least one HADDR and at least one HWRITE, and wherein the terminals have a plurality of wrapper cells associated therewith;
   determining if at least one attack on the system bus has occurred based on the values;
   capturing and shifting the values of a system bus for a plurality of bus transfers associated with the at least one IP core bus master and the IP cores; and
   denying access to the system bus if the computer hardware arrangement determines that the at least one attack has occurred.

8. The computer-accessible medium of claim 7, wherein the computer arrangement is further configured to modify a wrapper control logic and a wrapper boundary register of the at least one IP core bus master.

9. The computer-accessible medium of claim 7, wherein the computer arrangement is further configured to allow access to the system bus if (i) the computer arrangement determines that the at least one attack has not occurred, and (ii) the computer arrangement module has completed monitoring the values.

10. The computer-accessible medium of claim 7, wherein the computer arrangement is further configured to independently capture and shift the values of the system bus.

11. The computer-accessible medium of claim 7, wherein the IP cores include at least one of (i) memory access controllers, (ii) processors, (iii) image processors, or (iv) input/output controllers.

12. The computer-accessible medium of claim 7, wherein the computer arrangement is configured to wrap the serial input and the serial output using architecture from a previously-generated design-for-test architecture associated with the IP cores.

13. A method for wrapping at least one intellectual property (IP) core bus master, comprising:
    providing a plurality of IP cores associated with the at least one IP core bus master;
    wrapping a serial input of the at least one IP core bus master and a serial output of the at least one IP core bus master using a wrapper module;
    monitoring a plurality of values of a plurality of terminals associated with the at least one IP core bus master, wherein the terminals include at least one HADDR and at least one HWRITE, and wherein the terminals have a plurality of wrapper cells associated therewith;
    determining if at least one attack on the system bus has occurred based on the values;
    using a computer hardware arrangement, capturing and shifting the values of a system bus for a plurality of bus transfers associated with the at least one IP core bus master and the IP cores; and
    denying access to the system bus if the computer hardware arrangement determines that the at least one attack has occurred.

14. A system for wrapping at least one intellectual property (IP) core bus master, comprising:
    a plurality of IP cores associated with the at least one IP core bus master;
    a plurality of terminals coupled to the at least one IP core bus master wherein the plurality of terminals include at least one HADDR and at least one HWRITE;
    a plurality of wrapper cells associated with the plurality of terminals
    a wrapper module connected to a serial input of the at least one IP core bus master and a serial output of the at least one IP core bus master, wherein the wrapper module is configured to monitor a plurality of values of at least one of the at least one HADDR and the at least one HWRITE; and
    a computer hardware arrangement configured to determine if at least one attack on the system bus has occurred based on the values,
    wherein the wrapper module is configured to (i) capture and shift the values of a system bus for a plurality of bus transfers associated with the at least one IP core bus master and the IP cores, and allow access to the system bus if (a) the computer hardware arrangement determines that the at least one attack has not occurred, and (b) the wrapper module has completed monitoring the values.

15. A non-transitory computer-accessible medium having stored thereon computer-executable instructions for wrapping at least one intellectual property (IP) core bus master, wherein, when a computer arrangement executes the instructions, the computer arrangement is configured to perform procedures comprising:
    providing a plurality of IP cores associated with the at least one IP core bus master;
    wrapping a serial input of the at least one IP core bus master and a serial output of the at least one IP core bus master using a wrapper module;
    monitoring a plurality of values of a plurality of terminals associated with the at least one IP core bus master, wherein the terminals include at least one HADDR and at least one HWRITE, and wherein the terminals have a plurality of wrapper cells associated therewith;
    determining if at least one attack on the system bus has occurred based on the values;
    capturing and shifting the values of a system bus for a plurality of bus transfers associated with the at least one IP core bus master and the IP cores; and
    allowing access to the system bus if (i) the computer arrangement determines that the at least one attack has not occurred, and (ii) the computer arrangement module has completed monitoring the values.

16. A method for wrapping at least one intellectual property (IP) core bus master, comprising:
    providing a plurality of IP cores associated with the at least one IP core bus master;
    wrapping a serial input of the at least one IP core bus master and a serial output of the at least one IP core bus master using a wrapper module;
    monitoring a plurality of values of a plurality of terminals associated with the at least one IP core bus master, wherein the terminals include at least one HADDR and at least one HWRITE, and wherein the terminals have a plurality of wrapper cells associated therewith;
    determining if at least one attack on the system bus has occurred based on the values;
    using a computer hardware arrangement, capturing and shifting the values of a system bus for a plurality of bus transfers associated with the at least one IP core bus master and the IP cores; and
    using allowing access to the system bus if (i) the computer arrangement determines that the at least one attack has not occurred, and (ii) the computer arrangement module has completed monitoring the values.

* * * * *